(12) United States Patent
Rinaldi et al.

(10) Patent No.: US 12,055,438 B2
(45) Date of Patent: Aug. 6, 2024

(54) SENSOR AND METHOD USING BI-STABLE DIGITIZING MICROMECHANICAL SWITCHES FOR ANALOG MEASUREMENT OF INPUT SIGNALS

(71) Applicant: Northeastern University, Boston, MA (US)

(72) Inventors: Matteo Rinaldi, Boston, MA (US); Vageeswar Rajaram, Boston, MA (US); Zhenyun Qian, Boston, MA (US); Sungho (Ryan) Kang, Cambridge, MA (US); Sila Deniz Calisgan, Boston, MA (US); Antea Risso, Cambridge, MA (US)

(73) Assignee: Northeastern University, Boston, MA (US)

( * ) Notice: Subject to any disclaimer, the term of this patent is extended or adjusted under 35 U.S.C. 154(b) by 70 days.

(21) Appl. No.: 17/729,214

(22) Filed: Apr. 26, 2022

(65) Prior Publication Data

US 2022/0364919 A1 Nov. 17, 2022

Related U.S. Application Data

(60) Provisional application No. 63/189,801, filed on May 18, 2021, provisional application No. 63/180,021, filed on Apr. 26, 2021.

(51) Int. Cl.
*G01J 3/42* (2006.01)
(52) U.S. Cl.
CPC .................................... *G01J 3/42* (2013.01)

(58) Field of Classification Search
CPC ...... G01J 3/42; G01J 5/028; G01J 5/40; G01J 5/045
See application file for complete search history.

(56) References Cited

U.S. PATENT DOCUMENTS

| 10,643,810 | B2 | 5/2020 | Rinaldi et al. | |
|---|---|---|---|---|
| 2020/0116694 | A1 | 4/2020 | Rinaldi et al. | |
| 2022/0061238 | A1 | 3/2022 | Rinaldi et al. | |
| 2022/0099495 | A1* | 3/2022 | Rinaldi | G01J 5/0225 |
| 2023/0142881 | A1* | 5/2023 | Rinaldi | H10N 30/87 |
| | | | | 310/328 |

FOREIGN PATENT DOCUMENTS

| WO | 2017082985 A2 | 5/2017 |
|---|---|---|
| WO | 2020150732 A1 | 7/2020 |
| WO | 2020150743 A1 | 7/2020 |

OTHER PUBLICATIONS

Rinaldi et al. "Zero-power infrared digitizers based on plasmonically enhanced micromechanical photoswitches", Nature Nanotechnology, vol. 12, Oct. 2017, p. 969-973. (Year: 2017).*

(Continued)

*Primary Examiner* — David P Porta
*Assistant Examiner* — Casey Bryant
(74) *Attorney, Agent, or Firm* — Verrill Dana, LLP

(57) ABSTRACT

Ultra-low power methods and sensor devices are provided for determining the presence and magnitude of electromagnetic radiation or other signals. The sensor devices and methods provide both qualitative and quantitative analyses and can be deployed in remote locations for continuous monitoring over years without requiring a replacement power supply.

20 Claims, 19 Drawing Sheets

(56) References Cited

OTHER PUBLICATIONS

Cui et al., "Plasmonic and Metamaterial Structures as Electromagnetic Absorbers", arXiv, 2014, doi.org/10.48550/ arxiv. 1404.5695 26 pages.

Liu et al., "Research progress of the international road tunnel fire detection project", NRC Publications Archive, Canada, 2007 13 pages.

Olsson et al., "Zero and Near Zero Power Intelligent Microsystems", 2019 J. Phys .: Conf. Ser. Florida, vol. 1407 p. 012042 pp. 1-8.

Haxhibeqiri et al., "A Survey of LoRaWAN for IoT: From Technology to Application", Sensors, 2018 vol. 18, No. 11, pp. 3995 38 pages.

Ebyte "E32-915T20D User Manual" Datasheet 2019, downloaded from ebyte.com/en/downpdf.aspx?id=131 on Feb. 29, 2024 20 pages.

Texas Instruments, "MSP430FR2433 Mixed-Signal Microcontroller", Datasheet, Dec. 2019; downloaded from ti.com/lit/ds/symlink/msp430fr2433.pdf?ts=1709480239992 on Mar. 1, 2024 92 pages.

Infratech, Sensor Division, Accessed on 01-Mar. 2024 (infratec-infrared.com/sensor-division/service-support/faq/), 8 pages.

Qian et al., "Ultra-narrowband Metamaterial Absorbers for High Spectral Resolution Infrared Spectroscopy", Advanced Optical Materials, vol. 1801236, 8 pages, Nov. 2018.

Szyk, B., "Battery Life Calculator," Omni Calculator, 13-Jun. 2018 (Online, Accessed: 24-Feb. 2021), 6 pages.

Rajaram et al., "MEMS-Based Near-Zero Power Infrared Wireless Sensor Node", MEMS 2018, Belfast, UK. 2018, pp. 17-20.

Qian et al., "Zero-power Infrared Digitizers Based on Plasmonically Enhanced Micromechanical Photoswitches", in Nature Nanotechnology, vol. 12, pp. 969-973, Sep. 2017.

Vishay, "10 pA, Ultra Low Leakage and Quiescent Current, Load Switch with Reverse Blocking", SiP32431, Datasheet, Jan. 2021 pp. 1-15.

Calisgan et al., "Threshold-Triggered MEMS-CMOS Infrared Resonant Detector with Near-Zero Standby Power Consumption," 2019 TRANSDUCERS & Eurosensors Xxxiii, Berlin, Germany, 2019, pp. 637-640.

Rajaram et al., "Zero-Power Electrically Tunable Micromechanical Photoswitches", IEEE Sensors Journal, vol. 18, issue 19, pp. 7833-7841, 2018.

Calisgan et al., "Zero-Power Flame Detector with Wide Field-of-View Based on Plasmonically-Enhanced Micromechanical Photoswitch." 2021 21st International Conference on Solid-State Sensors, Actuators and Microsystems (Transducers). IEEE, (2021), pp. 263-266.

* cited by examiner

SENSOR AND METHOD USING BI-STABLE DIGITIZING MICROMECHANICAL SWITCHES FOR ANALOG MEASUREMENT OF INPUT SIGNALS

CROSS-REFERENCE TO RELATED APPLICATIONS

This application claims priority to U.S. Provisional Application No. 63/180,021, filed 26 Apr. 2021, which is incorporated by reference herein in its entirety. This application claims priority to U.S. Provisional Application No. 63/189,801, filed 18 May 2021, which is incorporated by reference herein in its entirety.

STATEMENT REGARDING FEDERALLY SPONSORED RESEARCH OR DEVELOPMENT

This invention was made with government support under Grant Number DE-AR0001052/202-287-6084 awarded by Advanced Research Projects Agency-Energy (APPA-E) US Department of Energy. The government has certain rights in the invention.

BACKGROUND

Battery-powered wireless sensors are of particular interest in sensor networks and internet of things (IoT) applications owing to their ability to be deployed anywhere without the need for any wiring. Remote deployment is especially valuable in applications that require placement in hard-to-reach or in hazardous areas. Significant advances in nanotechnology and microelectromechanical systems (MEMS) sensors have resulted in the development of sensors with low size, weight, and power which are critical for long-term remote deployment. However, state-of-the-art sensors are still either duty-cycled or actively scan the environment continuously (thus continuously drawing power at standby) for a signal of interest, ultimately limiting their lifetime to well below the maximum, i.e., below the shelf life of the battery itself (~10 years). For large-scale, high granularity sensor networks, the costs associated with periodic battery replacements can quickly become unsustainable, limiting their scalability in such situations (Olsson, et al., 2019).

Recently, a new class of sensors called 'near-zero power' sensors was developed to overcome this limitation by utilizing the energy in the sensed signal itself to perform its detection (Olsson, et al., 2019). These sensors are therefore event-driven and are always alert to the target signal to be detected (i.e., 100% duty cycle). Since the standby power is nearly eliminated, nearly all of the battery can be used to perform an active scanning function after detection, greatly extending the battery lifetime. IR digitizing sensors based on micromechanical photoswitches (MPs) first demonstrated in Qian, et al., 2017 are of particular interest owing to their ability to detect and distinguish low intensity IR radiation in specific mid-IR wavelengths that correspond to specific targets of interest. An MP essentially functions as a mechanical switch that closes when exposed to IR radiation matching the targeted wavelengths and having a power above a predefined threshold (set by its dimensions and contact gap). The transduction mechanism is in two steps: absorption and conversion of IR electromagnetic energy to heat by a plasmonic absorber (Kang, et al., 2018), and subsequent thermal actuation of its bimaterial beam, which eventually closes the electrical contacts at the beam's free end. The physical contact gap prevents current flow at subthreshold IR power inputs, enabling the near-zero standby power capability.

Owing to its simple functionality and digitized (binary—ON or OFF) output, it can be easily interfaced with a microcontroller as demonstrated previously in Rajaram, et al., MEMS 2018, where a wireless transmitter was activated whenever the MP was triggered by above-threshold IR radiation. In this case, only the data indicating the presence of a certain level of IR radiation was sent, with no information on the magnitude of the triggering radiation. This information can be extremely useful in the applications where users would like to know the distance between the sensor to a known IR source (e.g., human body or fire detection) or where further data processing is necessary to reduce the false alarm rate. One way to quantify the intensity of the incident IR while maintaining near-zero power consumption in standby is to use a secondary active IR detector that can be sequentially powered on through the MP to perform the measurement (Calisgan, et al., 2019). However, this approach increases circuit complexity, cost and size especially for IR detectors (such as pyroelectric ones) and filters at mid-IR wavelengths.

SUMMARY

The present technology provides ultra-low power devices and methods for determining the presence and magnitude of electromagnetic radiation or other input signals. The devices can be deployed in remote locations and can be utilized in an ultra-low power, continuously monitoring mode for years without requiring a replacement power supply. In examples, the lifetime of the power supply is limited by the shelf lifetime of a battery and not by a power consumption of the devices.

The devices can include wireless transmission that is only activated to transmit information such as the magnitude of a detected input signal or information about alteration or damage to the device.

The technology can be further summarized by the following list of features.

1. An ultra-low power sensor device capable of detecting a signal and measuring a magnitude of the detected signal, the device comprising
   a micromechanical switch comprising a sensor element and two contact elements, wherein the switch is configured to close a gap between the contact elements in response to a signal received by the sensor element;
   a microcontroller comprising a sensing circuit and a battery, the microcontroller configured to apply a voltage bias sweep across the contact elements in response to a signal detected by the sensing element, wherein said voltage bias sweep determines a pull-in voltage that closes the gap between the contacts, and wherein the pull-in voltage provides a measure of the magnitude of the detected signal.
2. The sensor device of feature 1, wherein the micromechanical switch is a micromechanical photoswitch and the signal is an electromagnetic radiation.
3. The sensor device of feature 2, wherein the micromechanical photoswitch comprises a substrate, an absorber head, a reflector head, and said contact elements; wherein the reflector head is attached at one end to the substrate and comprises a metallic layer comprising a microheater and a layer comprising one of said contact elements;
   wherein the absorber head is attached at one end to the substrate and comprises the other of said contact elements and a plasmonic absorber, the plasmonic absorber configured to absorb electromagnetic radiation within a spectral band for detection; and wherein the micromechanical photoswitch is configured such that absorption of electromagnetic radiation within said spectral band by the absorber head causes the contact elements to move and close the gap.

4. The sensor device of feature 3, further comprising a first cantilever disposed on the substrate, the first cantilever comprising the absorber head, an inner pair of temperature-sensitive bimaterial legs, and an outer pair of temperature-sensitive bimaterial legs, the inner pair of legs attached to opposite sides of the absorber head, the outer pair of legs attached to a surface of the substrate and disposed adjacent to the inner pair of legs forming first and second sets of inner and outer legs, the first and second sets of legs disposed symmetrically on opposite sides of the absorber head;

a first thermal isolation region connecting the inner and outer legs of the first set of legs, and a second thermal isolation region connecting the inner and outer legs of the second set of leg;

a second cantilever on the substrate, the second cantilever disposed adjacent to the first cantilever and with mirror symmetry to the first cantilever; the second cantilever comprising an inner pair of temperature-sensitive bimaterial legs, and an outer pair of temperature-sensitive bimaterial legs, the inner pair of legs attached to opposite sides of the reflector head, the outer pair of legs attached to a surface of the substrate and disposed adjacent to the inner pair of legs forming first and second sets of inner and outer legs, the first and second sets of legs disposed symmetrically on opposite sides of the reflector head; and a second thermal isolation region connecting the inner and outer legs of the second set of legs; wherein the bimaterial legs of the second cantilever each comprise a bottom insulating layer and a top conductive layer, the legs providing compensation for ambient temperature changes; and wherein the bimaterial legs of the first cantilever and the bimaterial legs of the second cantilever provide similar temperature compensation.

5. The sensor device of any of the preceding features, further comprising a wireless transmitter, wherein the device is configured to transmit a radio transmission after said signal is detected, the radio transmission comprising information indicative of the magnitude of the detected signal.

6. The sensor device of any of the preceding features, wherein the microcontroller comprises a processor, a memory, and instructions for performing said voltage bias sweep and storing a measured value of said pull-in voltage bias.

7. The sensor device of feature 6, wherein the memory further comprises a calibration curve, and wherein the processor is operative to compare a measured pull-in voltage bias to the calibration curve and thereby determine the magnitude of the detected signal.

8. The sensor device of any of features 2-7, wherein the electromagnetic radiation has a wavelength in the range from about 100 nm to about 3 mm.

9. The sensor device of feature 8, wherein said electromagnetic radiation is infrared radiation.

10. The sensor device of any of the preceding features, wherein the device has a power consumption in a standby state of less than about 850 nW.

11. The sensor device of any of the preceding features, wherein the sweeping voltage bias is applied as a pulse width modulated voltage.

12. The sensor device of any of the preceding features that can continuously remain in a standby state for at least 10 years using a single battery.

13. A sensor device comprising two or more of the sensor devices of any of the preceding features; wherein each of the two or more sensor devices is configured to detect a different signal.

14. The sensor device of feature 13 configured as a spectrometer.

15. A sensor device comprising one or more devices of any of the preceding features, wherein the device is configured as an exhaust heat detector, a plume detector; a living organism detector, a proximity detector, an infrared detector, a visible light detector, a color detector, an activator device configured to activate a machine, or an electro-optical detector.

16. An ultralow power sensor device comprising:

a substrate with a first electrical contact disposed on the substrate;

a movable component attached at one end to the substrate; the component comprising a second electrical contact disposed at an opposite end of the component; the component operative to move in a proportion to a response to an input signal; wherein position of the second contact relative to the first contact determines whether the switch is in an ON or OFF state;

a power supply with a circuit and a voltage applied between the first contact and the second contact; wherein application of the voltage causes the second contact to move toward the first contact in a proportion to the applied voltage;

wherein the input signal comprises a signal derived from the group consisting of a vibration, a physical movement, a temperature change, electromagnetic radiation within a spectral band, a mechanical or electrical shock, a wind or a pressure change, a chemical or biomolecule, a sound, a change in a physical state, and a change in an environmental condition.

17. The sensor device of any of the preceding features, further comprising an outer packaging containing the sensor device or switch and a vacuum within the packaging, wherein the packaging is transparent to electromagnetic radiation within a spectral band selected for detection; and wherein the packaging optionally comprises a lens.

18. A method for detecting and determining a magnitude of an electromagnetic radiation, the method comprising the steps of:

(a) providing the sensor device of any of the preceding features and, using the microcontroller of the device:

(b) applying a voltage bias across the contact elements;

(c) determining a current flow through the contact elements;

(d) maintaining the sensor device in a standby state while the current flow is less than a wake-up current;

(e) recording a detection of the electromagnetic radiation when the current flow is at or above the wake-up current;

(f) applying a reset pulse voltage to the reset microheater, whereby the reflector head is heated and the contact elements are reset; and (g) applying a sweeping voltage bias across the contact elements, whereby a pull-in voltage bias is measured, the pull-in voltage bias indicative of a magnitude of the detected electromagnetic radiation.

19. The method of feature 18, wherein step (g) is performed less than about 1 second after step (f).

20. The method of feature 18 or 19, wherein step (g) further comprises comparing the determined pull-in voltage bias to a calibration curve stored in a memory of the microcontroller and thereby determining the magnitude of the detected electromagnetic radiation.

21. The method of any of features 18-20, wherein the sensor device comprises a wireless transmitter, and the method further comprises:

(h) transmitting a signal indicating one or more of the detection, a time of detection, the pull-in voltage bias, and the magnitude of the electromagnetic radiation.

22. The method of any of features 18-21 wherein power consumption of the device in the standby state is less than 1 µW.

23. The method of any of features 18-22, wherein the method is carried out continuously for at least about 10 years without replacement of the battery.

24. The method of any of features 18-23 wherein said electromagnetic radiation is in the range from about 100 nm to about 3 mm in wavelength.

25. The method of feature 24, wherein said electromagnetic radiation is infrared radiation.

26. The method of any of features 18-25, wherein the wakeup current is about 1 µA.

27. The method of any of features 18-26, wherein the sweeping voltage bias is applied as a pulse width modulated voltage.

28. The method of any of features 18-27, further comprising low-pass filtering between the microcontroller and one or both of the contact elements.

29. A method for spectral analysis of an electromagnetic radiation, the method comprising:

(a) providing a device comprising two or more of the sensor devices of any of features 1-17; wherein each of the two or more sensor devices is configured to detect a different spectral band of the electromagnetic radiation; and (b) performing the method of any of features 18-28 using the provided device.

30. A method for detecting, identifying, and/or determining a proximity of a vehicle or a living organism, the method comprising:

(a) providing the device of any of features 1-17; and (b) performing the method of any of features 18-19, whereby the vehicle or living organism is detected, identified, and/or its proximity determined.

31. A kit for detecting the presence of an electromagnetic radiation, the kit comprising two or more devices of any of features 1-17 and instructions for carrying out the method of any of features 18-30.

As used herein, the term "about" refers to a range of within plus or minus 10%, 5%, 1%, or 0.5% of the stated value.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with the alternative expression "consisting of" or "consisting essentially of".

DESCRIPTION

Figure 1A:
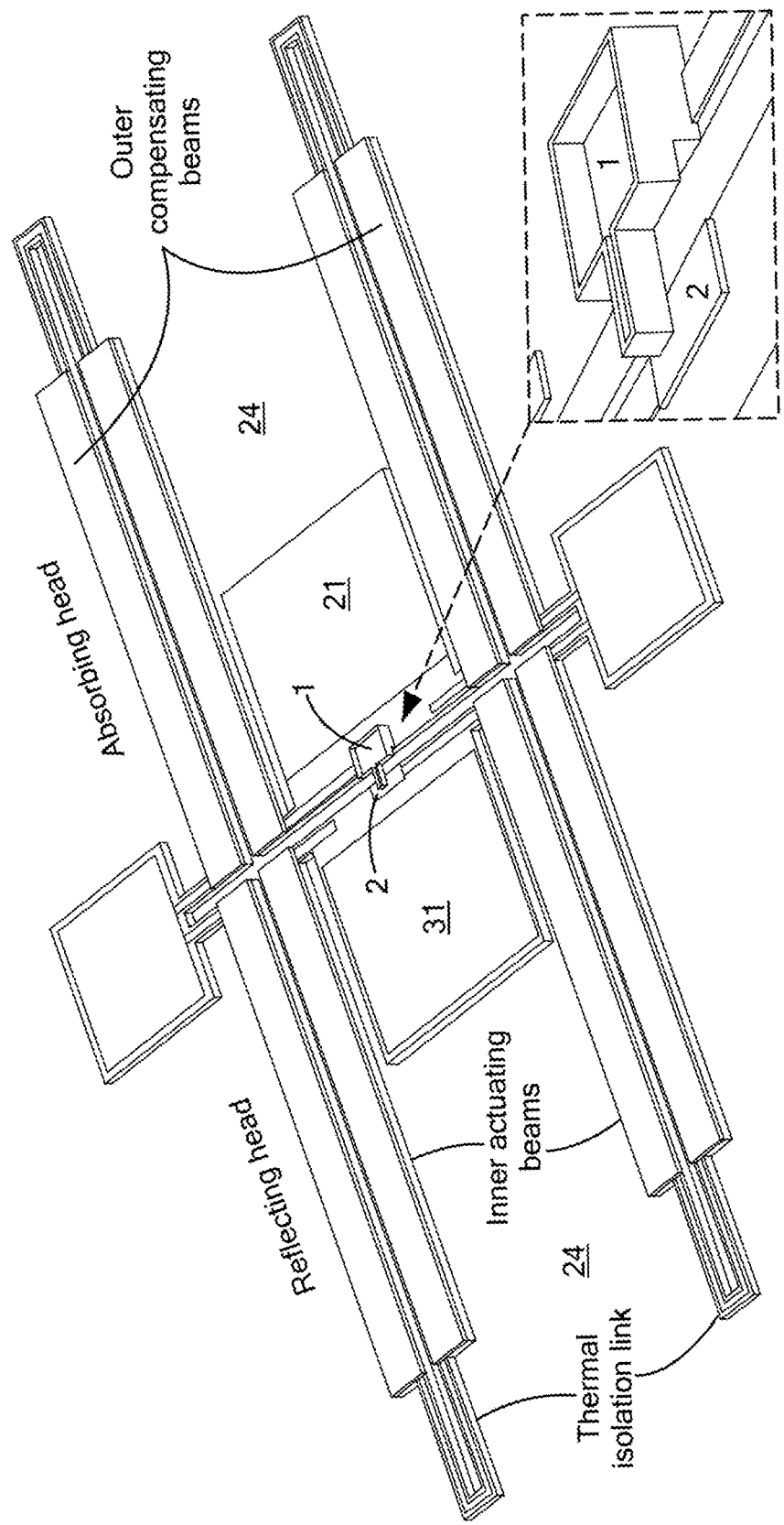
FIG. 1A shows a schematic illustration of a micromechanical photoswitch (MP) including two heads, a contact element 1 and a source electrical contact 2 (electrical contacts). The inset shows the contact region in which the electrical contacts 1 and 2 are shown in the open position.

The present technology provides sensor devices and methods that use mechanical switches as the sensing element. The switches work by moving a switch component in response to an input signal, corresponding to an event to be detected, and turning ON when the magnitude of the input signal exceeds the threshold required to close the electrical contacts (i.e., to turn ON). Movement of the component can be driven by power from the input signal, with the switch in a ready or standby state consuming zero or almost zero power. For example, the switches can be micromechanical switches having a size in the micron range or millimeter range. The output of the sensing element (the switch) is therefore "ON" if the magnitude of the input signal is above the designed threshold or "OFF" when the magnitude of the input signal is below the threshold. The switch is therefore a "bi-stable" switch with the ability to detect an above-threshold input signal.

On its own, the switch does not have the capability to determine the exact magnitude of the input signal (a quantitative measurement). The technology herein can provide quantitative analyses in addition to detection of specific input signals (the qualitative analysis). The present technology also provides higher sensitivity than previous sensors and lower power consumption, without requiring complicated circuitry. The technology can be implemented using analog circuitry, digital circuitry, or both.

The technology provides methods to enable above-threshold quantitative measurements in the above-described switches. The methods can be applied to any mechanical switch that is used for detecting input signals. For example, the input signals can be broadband or narrow band electromagnetic radiation, UV, visible, or IR light (e.g., used to detect bright or warm objects), chemicals (for detecting molecules), radio frequencies (to detect wireless signals), temperature, or other physical or chemical phenomena capable of activating the switch.

The switches utilized in the present technology can include a cantilever-shaped structure, which can be specifically sensitized to the desired input signal. The switches include a pair of electrical contacts separated by a physical contact gap at one end. The absorption of the input signal causes a reduction in the contact gap. The reduction in the contact gap is in proportion to the absorption. This gap can be measured by sweeping a voltage across the contacts using a sweep voltage. The contacts abruptly close at a specific value of voltage (called the pull-in voltage value or pull-in value) which is dependent on the contact gap. Thus, the voltage at which the switch closes (pull-in value) can be used to measure the gap and the magnitude of the input signal. The pull-in value can be measured at any time. For continuous monitoring (e.g., in remote deployment), the pull-in value can be measured after an input signal above the threshold is detected, activating the sensor device. This low-power sequence of operation saves power consumption. In another example, the devices discussed herein can self-activate (using an ultra-low power clock), measure a pull-in value to self-calibrate or self-test. This example provides a device that prevents tampering and detects environmental damage.

Experiments using the low-power sequence of operation are described below. In an example, a thermal input signal (electrical, electromagnetic radiation, or IR) with above-threshold input magnitude is used to close the switch. The switch is opened, and a voltage sweep is subsequently applied across the same switch's contacts to measure the pull-in value of the triggering input signal above the threshold value. Surprisingly, using the same switch for the qualitative event, wherein the switch is closed in a response to a specific spectral band, and for the quantitative measurement, is highly accurate. An initial calibration established for a specific switch can provide the high accuracy and can provide a baseline calibration to determine switch stability (or damage) over long periods of time. For example, a simulation calibration curve can be remotely acquired by the sensor. By comparing the simulation calibration curve to the initial calibration, damage, wear, or alteration of the sensor can be determined.

No other switch-based sensor exists that can detect and measure the magnitude of an above-threshold input signal using the same switch itself. Compared to conventional sensors that actively perform measurements of the input signal to determine if the input signal value exceeds a specific threshold, thereby consuming power continuously, the switch-based technique described herein is completely passive and uses the energy in the input signal itself to perform the above-threshold detection function. The exact value of the input signal can then be found using a voltage sweep that is applied to the same switch (immediately after the switch is reset).

The present technology exploits the dependence of the contact gap of a cantilever-based mechanical switch on the input signal, as well as the electrostatic "pull-in" phenomenon on the contact gap. In this example, "bimaterial" type cantilevers are used for switch-based sensing. These include a cantilever beam made of at least two layers and fixed on one end with an electrical contact at one end separated from another electrical contact below it. Upon application of the input signal of interest, since the top layer is sensitized to the effect induced by the absorption of the signal, the top layer undergoes mechanical expansion. The top layer can be fabricated to detect a broad band of electromagnetic radiation (e.g., to detect passersby), or the top layer can be fabricated to detect a narrow spectral band of electromagnetic radiation (Cui, et al., 2014). This absorption creates a stress difference between the two layers causing the beam to effectively bend in response. This reduces the contact gap. The contact gap is therefore a function of the magnitude of the input signal. An electrical voltage sweep is used to estimate this contact gap, as further described below.

In an example, FIG. 1A shows a schematic illustration of a micromechanical photoswitch (MP) including an absorber head 21 with a contact element 1. A reflector head 31 includes a source electrical contact 2. The contact element 1 and the source electrical contact 2 are referred to as the contacts. The inset of FIG. 1A shows the contact region in which the electrical contacts 1 and 2 are shown in the open position. The heads can be attached to a surface 24 of a substrate at an end via cantilever mechanics. If the MP is deployed in an environment, for example, with large temperature variations or vibrations, the cantilever mechanics can provide adjustments to tune out the temperature variations or vibrations, providing specific detection of a spectral band in spite of the background variations (noise). If the MP is deployed in a controlled environment (e.g., an air-conditioned building), detailed noise cancelation mechanics are not necessarily required.

Since the pair of electrical contacts 1 and 2 are effectively a pair of capacitor plates attached to a flexible spring (e.g., the cantilever), application of a voltage bias across the contacts generates an electrostatic force. This electrostatic force causes a reduction in the contact gap as well, due to the attractive force between the contacts. If the voltage reaches a specific value, called the "pull-in" voltage, the contacts spontaneously close and effectively turn ON the switch. The pull-in voltage decreases as the original contact gap of the switch decreases and as the incident input signal increases. By measuring the pull-in voltage value (via a sweep of the applied bias voltage) after reduction of the gap by the input signal, the value of the input signal can be determined. In this example, the present technology utilizes both the input signal-induced gap reduction as well as the voltage-induced gap reduction to perform an analog measurement of the input signal. The analog measurement can be accomplished using a sweeping voltage that is pulse modulated. A low-pass filter can be in series with the pulse modulated voltage sweep. The low-pass filter can enable detection of an abrupt current increase when the contacts close. This current increase can be utilized as a wake-up current to activate a microcontroller including non-volatile memory, programming, processor, and any other peripherals (e.g., long-range transmitter).

This is demonstrated by using a bimaterial switch sensitized to detect thermal inputs (via electrical joule heating or exposure to IR radiation). The switch is subjected to a constant voltage in the standby state (i.e., the nominal state without any input signals) using a microcontroller. Application of the constant voltage results in the switch having a specific designed detection threshold. When exposed to a specific input signal with a magnitude greater than this detection threshold, the switch closes due to pull-in. Upon its closing, the microcontroller, which is otherwise in a low-power sleep mode, wakes-up, resets the switch and applies a voltage sweep across the switch. The switch closes at a specific voltage value (pull-in value) in the range of the voltage sweep, which is a quantitative measure of the input signal magnitude. This specific voltage value is saved in a memory of the microcontroller and converted to the input signal value using a calibration curve. The calibration curve can also be stored in the memory of the microcontroller. Zero power memory, for example, ferroelectric RAM, can record the specific pull-in value for many years along with calibration curves, programming, an any other data recorded during wake-up.

Figure 1B:
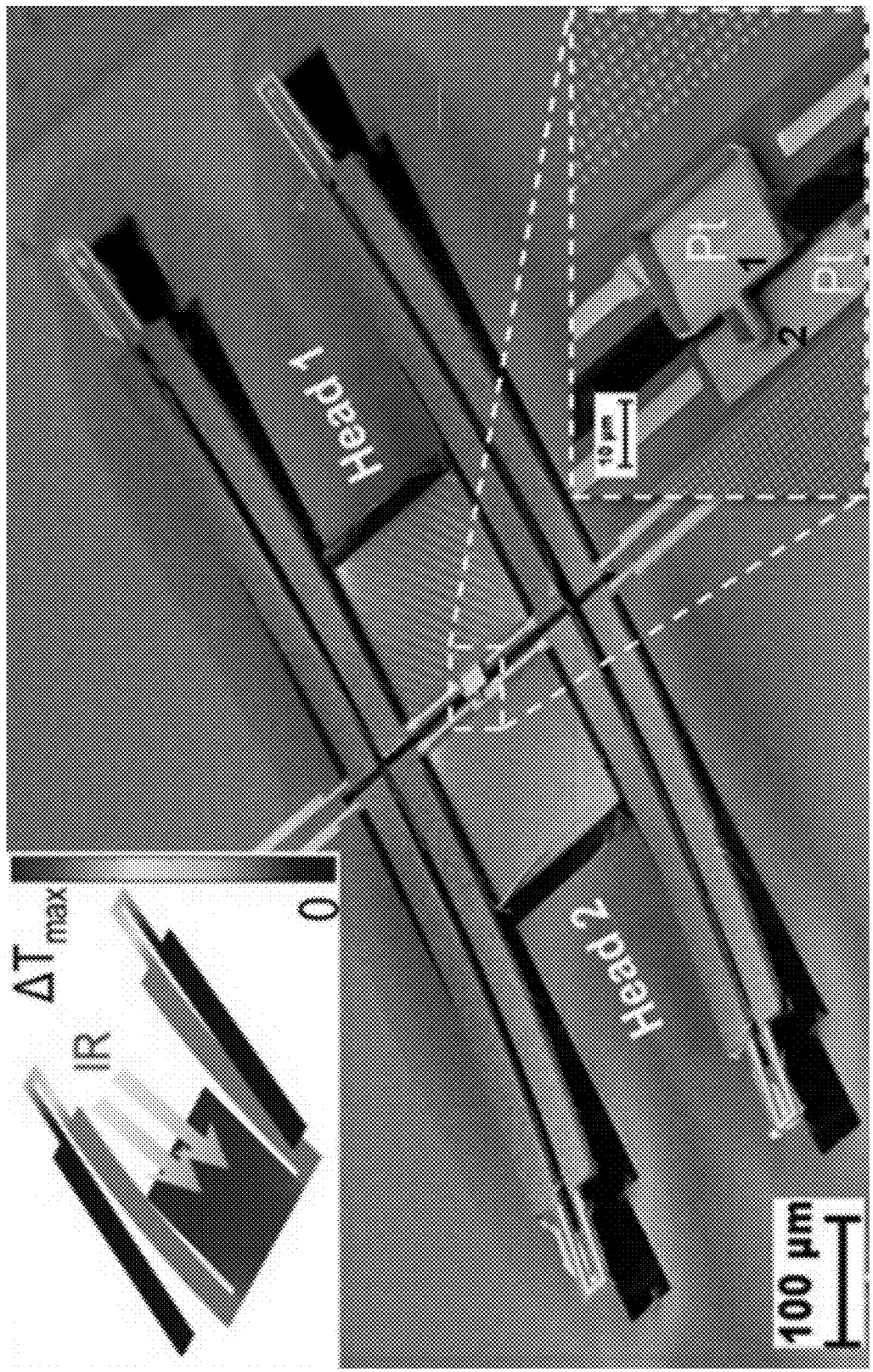
FIG. 1B shows a scanning electron microscope image of an MP including two heads. The contact region, shown enlarged at bottom right, shows two platinum electrical contacts 1 and 2. The inset at the upper left illustrates how an absorption of IR radiation at plasmonically-enhanced head 21 causes the inner actuating beams to bend downward relative to the outer compensating beams.

This technology demonstrates examples of a sensor that is in an extremely low power state at standby, can wake-up when exposed to a targeted input signal, and then can subsequently evaluate the level if the triggering input signal, all through the use of a single switch. For example, FIG. 1B shows a scanning electron microscope image of an MP including an absorber head 21 and a reflector head 31 with substrate surface 24. The contact element 1 and the source electrical contact 2 are shown in the enlarged image at lower right in the in the open (OFF) position. The contact region, shown enlarged at bottom right, contains the two platinum electrical contacts 1 and 2. The inset at the upper left illustrates how absorption of IR radiation at plasmonically-enhanced head 21 causes the inner actuating beams to bend downward relative to the outer compensating beams.

The voltage-based sweep procedure disclosed herein can be used in other applications that employ switches that undergo displacement upon exposure to a targeted input signal. It can also be used in duty-cycled applications that do not require low standby power consumption. That is, the sweep can be performed at periodic intervals to measure any value of input signals rather than just above-threshold values. The ultra-low power microcontroller used to demonstrate the technology includes a clock that can activate the microcontroller at intervals. In this example, the clock can consume a majority of any power consumed when the system is in the standby state.

Figure 2A:
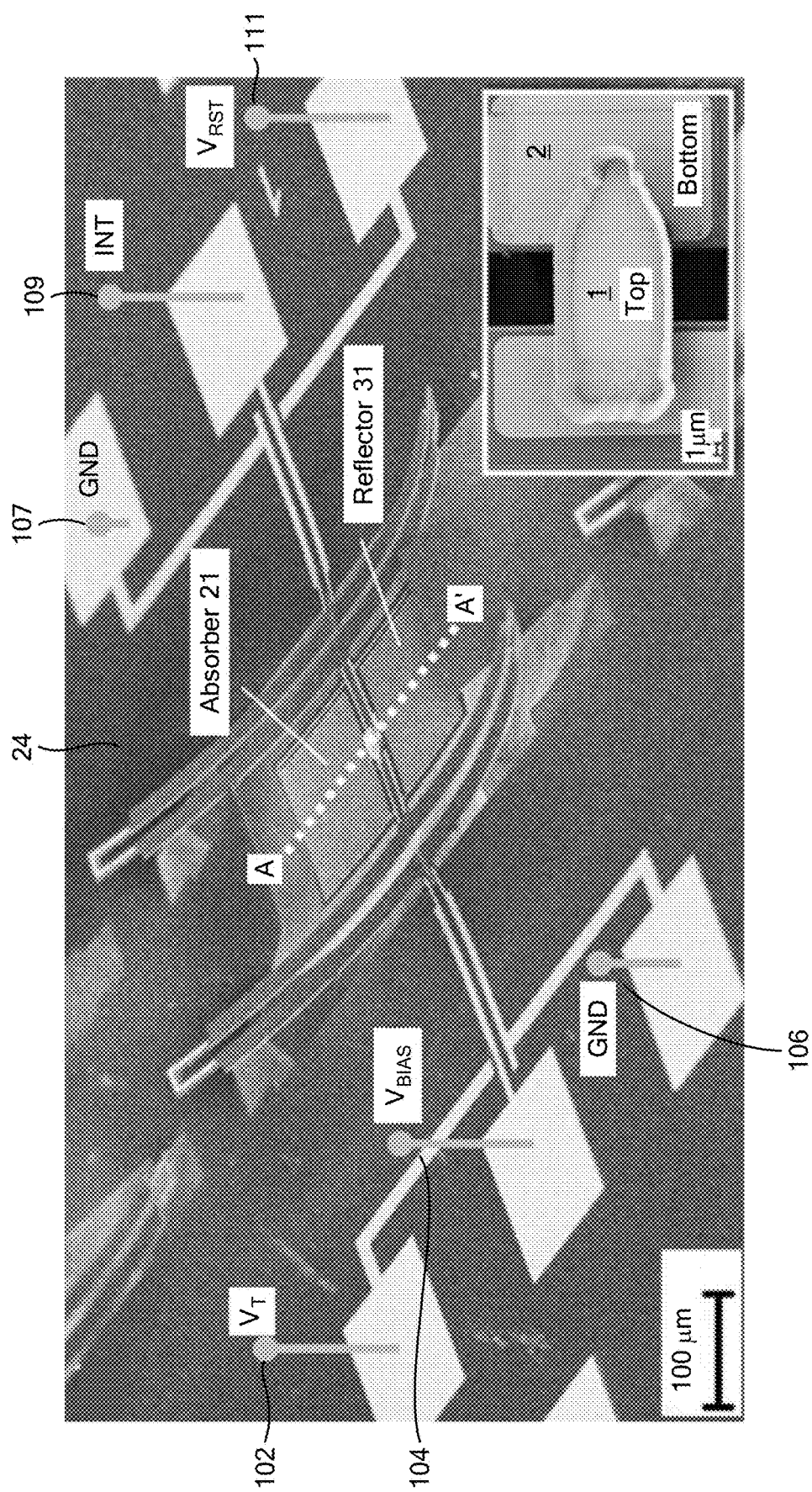
FIG. 2A shows a scanning electron microscope image of an MP and pin connections to a microcontroller. The absorber head 21 and the reflector head 31 are shown with electrical contacts at center, which are enlarged at lower right. The enlarged top view (at lower right) shows a triangular top electrical contact and a bottom electrical contact.
Figure 3:
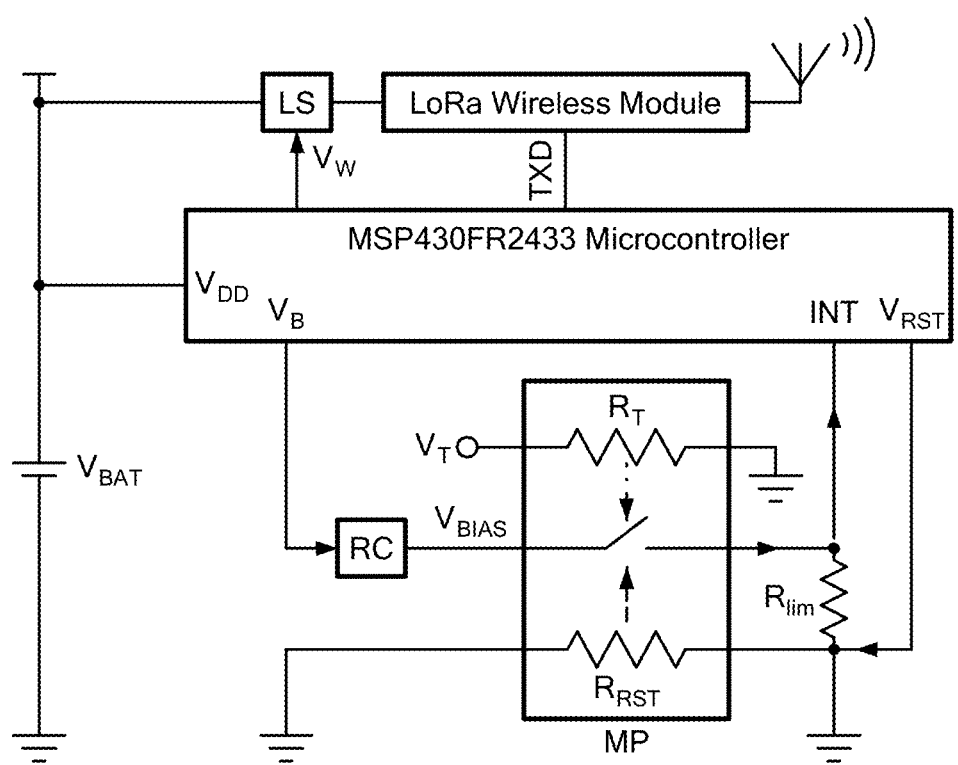
FIG. 3 shows an example schematic of a sensor system including an MP, low-pass filter (RC), load switch (LS), long-range wireless transmitter (LoRa), and a microcontroller with input/output labels.

To demonstrate an example of connection of a microcontroller to a switch, FIG. 2A shows a scanning electron microscope image of an MP and pin connections for a microcontroller. The substrate surface 24, the absorber head 21 and the reflector head 31 are shown with electrical contacts at center (enlarged view of contacts at lower right). The inset shows an enlarged top view of a triangular top electrical contact 1 and a bottom electrical contact 2. The MP has three pairs of contact pads on either side, each connected to different pins on a microcontroller schematic, as shown in the schematic in FIG. 3. In FIG. 3, the absorber side heater (RT) is connected to $V_T$ 102 in FIG. 2A. The reflector side heater ($R_{RST}$) in FIG. 3 is connected to the VRST 111 in FIG. 2A. One of the middle pads in FIG. 2A ($V_{BIAS}$ 104—connected to the top contact 1) is connected to the pin VB (FIG. 3) through an RC low pass filter circuit ("RC", FIG. 3), and the other (bottom contact 2) is connected to the INT 109 in FIG. 2A. Ground 106 and 107 (GND) are also shown in FIG. 2A. Grounds for the microcontroller are shown schematically in FIG. 3. A load switch "LS" and long-range wireless module are also illustrated in FIG. 3. The LS enables activation of almost any device after the microcontroller enters a wake-up state.

Figure 2B:
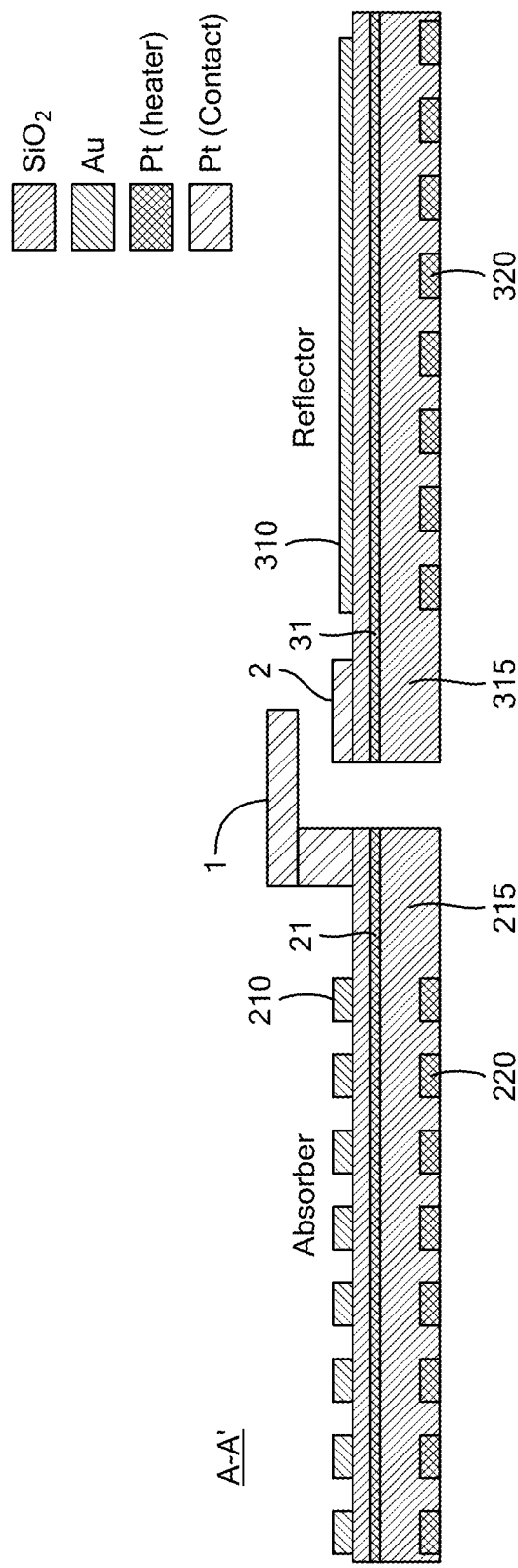
FIG. 2B shows a cross sectional view of the layer stack of the absorber and reflector heads with electrical contacts at center.

The absorber head and the reflector head can be described using example layers. FIG. 2B shows a cross sectional view of the layer stack of the absorber 21 and reflector 31 heads with electrical contacts 1 and 2 shown at center. The absorber head 21 can include a bottom metallic (or semi-metallic, or a durable material) layer 215 and a top plasmonic absorber 210. An absorber microheater 220 can be utilized to provide heat to the absorber head 21, for example, to provide simulations, device checks, or calibrations. The reflector head 31 includes a reset microheater 320. The reset microheater can be utilized to open the contacts 1 and 2 after the switch is closed. The reflector head 31 can include a reflector layer 310. Example materials of $SiO_2$, Au, and platinum are shown at the right of FIG. 2B for the components.

In an IR example, the technology enables the first ultra-low power IR wireless sensor based on an IR micromechanical photoswitch (MP) and a microcontroller capable of quantifying the above-threshold input IR radiation and transmitting the measured value wirelessly. The entire sensor node remains asleep (e.g., standby power of about 811 nW) until awakened by the always-alert IR digitizer (i.e., the MP) upon exposure to targeted IR radiation. Unlike existing switch-based zero power sensors that only provide a binary output (i.e., indicate the presence or not of an IR source), the awakened sensor exploits a thermally modulated electromechanical pull-in mechanism to measure the magnitude of the incident IR power using the same MP, the value of which is then transmitted wirelessly to a remote gateway. The prototypes demonstrated herein pave the way for maintenance-free powered sensors for long-term and high-granularity remote deployment. For example, long-term monitoring capability of the prototypes can be only limited by the shelf-life of the power supply. With the self-check capabilities of the devices disclosed herein, it is contemplated that the technology can enable monitoring for various input signals, along with accurate quantitative analyses, for decades.

The wireless sensor system can include three main components: the MP, a microcontroller (e.g., MSP430FR2433, Texas Instruments) and a long-range wireless module (LoRa, FIG. 3). The MP can include two symmetric folded bimaterial cantilevers, each with a square shaped absorber or reflector head (FIG. 2A). The absorber head has a 'top' contact 1 while the reflector has a 'bottom' contact 2, and both are separated by a submicron gap (FIG. 2A inset). In this example, the absorber head incorporates a metal-insulator-metal (MIM) plasmonic absorber (Kang, et al., 2018) that is designed to absorb specific narrowband IR radiation. Upon exposure to these wavelengths, the plasmonic absorber converts electromagnetic energy to heat, which causes the attached bimaterial beam to bend down and close the gap if the incident IR power is above the designed threshold. Further details about the design and fabrication can be found in Qian, et al., 2017.

Microheaters are embedded under both heads (FIG. 2B). The reflector heater 320 is used to reset the contact after a detection. The absorber heater 220 is used to electrically simulate IR absorption (via Joule heating) for testing purposes as well as to enable potential on-site self-calibration of threshold and of calibration curves. A zero-power memory of the microcontroller can contain quality control data and/or event data for years.

The microcontroller demonstrated herein, the circuit in FIG. 3, and the MP can be in other configurations. In the demonstrations herein, the MP has three pairs of contact pads on either side (FIG. 2A), each connected to different pins on the microcontroller as shown in the schematic in FIG. 3. The absorber side heater ($R_T$, FIG. 3) is connected to $V_T$ 102 in FIG. 2A (supplied by an external DC source in this example), and the reflector side heater ($R_{RST}$, FIG. 3) is connected to $V_{RST}$ 111 in FIG. 2A. One of the middle pads ($V_{BIAS}$ 104—connected to the top contact) is connected to the pin $V_B$ through an RC low pass filter circuit ("RC", FIG. 3), and the other (bottom contact) is connected to the INT 109 pin.

The microcontroller is also connected to a LoRa wireless module (SX1276) (Ebyte) and a load switch (LS, SiP32431, Vishay), both illustrated in FIG. 3. The LoRa and the LS are kept inactive until there is a need to transmit data. Popular in IoT applications, a LoRa-based transmitter is demonstrated for its strengths in long range communication (>5 km), low power consumption, cost, and low complexity (Haxhibeqiri, et al., 2018). The load switch is chosen for its ultra-low standby leakage of 10 s pA (i.e., when VW is 0 V) and its high current handling capability. It is worth noting that compared to previous work (Rajaram, et al., *MEMS* 2018) where the MP merely controlled the power supply to the transmitter, the MP here is connected as a peripheral to the microcontroller. This allows for enhancing the functionality of the sensor with the tradeoff of having higher standby power consumption (from ~1 s nW to ~100 s nW). Because of the ultra-low standby power consumption of the selected COTS (commercial off the shelf) microcontroller, the impact on overall lifetime is expected to be negligible for most applications powered by a regular sized coin battery. The load switch (LS, FIG. 3) can be utilized to activate high-power peripherals if desired. The LoRa module shown in FIG. 3 can provide an example of one or more other peripherals activated when the microcontroller enters a wake-up state.

Figure 4:
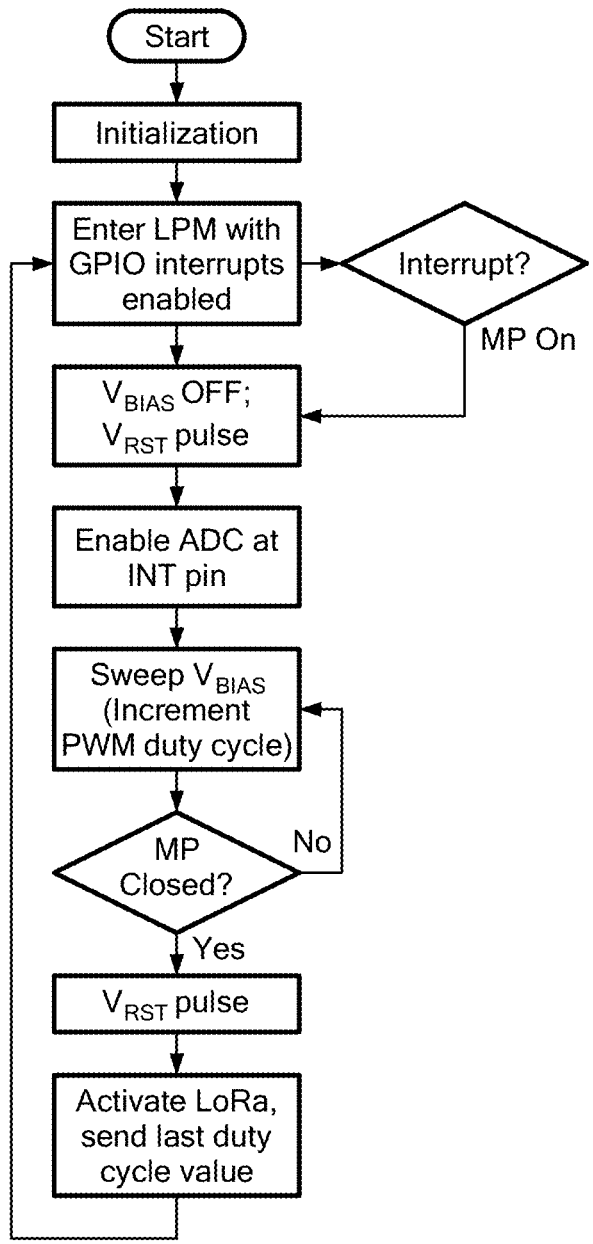
FIG. 4 shows a flowchart illustrating a sensor operation sequence and microcontroller programming.

An operation sequence for the sensor system is illustrated in FIG. 4. Upon power up, the microcontroller initializes its pins and internal modules. All pins connected to the MP are configured as general-purpose input output (GPIO) pins, with $V_B$, $V_{RST}$ set as outputs and INT as input. A logic high (3.3 V) is also set on the VB pin, which is applied across the MP contacts. A key feature of the microcontroller is the ability to go into a sleep or low power mode (LPM), where almost all functions including the processor are powered OFF. A clock can remain active during sleep, for example, to periodically wake-up the microcontroller to check the MP. The microcontroller can be woken up using internal or external interrupts. In this implementation, the microcontroller is programmed to keep VB high and remain in a sleep mode until woken up by a logic high signal on the INT pin (i.e. when the MP contacts are in the ON state).

When the interrupt is generated from the INT pin after exposing the MP to above-threshold electromagnetic radiation or input signal, the microcontroller powers on fully and turns OFF VB, and applies a short pulse to $V_{RST}$ to reopen the MP. Then the program starts the measurement of the electromagnetic radiation signal that turned ON the MP. To do this, a novel mechanism is utilized based on the coupling of thermal actuation with the electromechanical pull-in phenomenon. Pull-in of contacts occurs between movable capacitive plates (the top and bottom contacts in the MP) when the electrostatic force induced by a bias can no longer be counteracted by the cantilevers' restoring force. The voltage required to trigger the pull-in depends on the remaining gap reduced from the as-fabricated gap when the device is under the electromagnetic radiation-induced thermal actuation. As the magnitude of the electromagnetic radiation (power) increases, the gap decreases, as does the pull-in voltage. Thus, by measuring the pull-in voltage with electromagnetic radiation (EM) power applied, measuring the EM power is done using the same MP. The governing equation (model) is derived in Rajaram, et al., *IEEE*, 2018 and relates the input power P with this voltage $V_P$:

$$P = P_0\left[1 - \left(\frac{V_P}{V_{PI}}\right)^{\frac{2}{3}}\right] \qquad \text{Equation (1)}$$

Where, $P_0$ is the intrinsic threshold (at 0 V bias) and $V_{PI}$ is the intrinsic pull-in voltage (e.g., without IR input; $V_{PI}$ needs to be higher than 3.3 V to remain open when biased). In this model, to find the $V_P$ for a given input IR power, the microcontroller first enables the analog to digital convertor (ADC) module on the INT pin and sweeps the voltage VBIAS across the MP. The sweep can be done by applying a pulse width modulated (PWM) signal (10 kHz) at VB and using a low pass RC filter to average the signal (R=10 kΩ; C=1 μF). Increasing the duty cycle from 0 to 100% creates a ramp signal at VBIAS that increases from 0 to 3.3V. The sweep is stopped when the MP closes (i.e., when the INT pin detects a voltage>0V). Then a reset pulse is applied again, and the last duty cycle value is recorded. The load switch is then enabled, and this value is sent to the LoRa transmitter using the TXD pin. The microcontroller then returns to the sleep mode and awaits another interrupt.

The present technology can provide a switch-based signal detection method with integrated measurement functionality (analog, quantitative, sensing, not just ON-or-OFF sensing). The technology can be implemented with a simple voltage-sweep based readout method (only one switch required, no conditioning circuitry required).

The technology can be applied to any switch-based sensor whose contact gap is sensitive to the signal to be detected. A cost-effective, miniaturized solution with no complex circuit requirement is enabled. The technology is proven to provide extremely high sensitivity for IR sensing, 5.28 mV/nW, without requiring additional circuitry. This is more than one million times the sensitivity of commercial IR sensors (thermopile or pyroelectric-based), which require amplifiers or chopping circuitry to increase their sensitivity to this level.

The technology can also be used for chemical sensing, RF sensing, temperature sensing, sensing of any type of electromagnetic radiation, electrical current sensing, acceleration sensing, vibration sensing, sensing of mechanical stimuli that cause bending of the cantilever structure of the switch or movement of a component of the switch.

Zero power sensors based on switches are enabled by the technology disclosed herein. The availability of long-term remote sensing, for example, human proximity and fire sensing, is vastly increased by the technology. The technology enables low cost, long-lifetime sensors, battery-powered sensing applications, all of which can be connected to the IoT.

Figure 5:
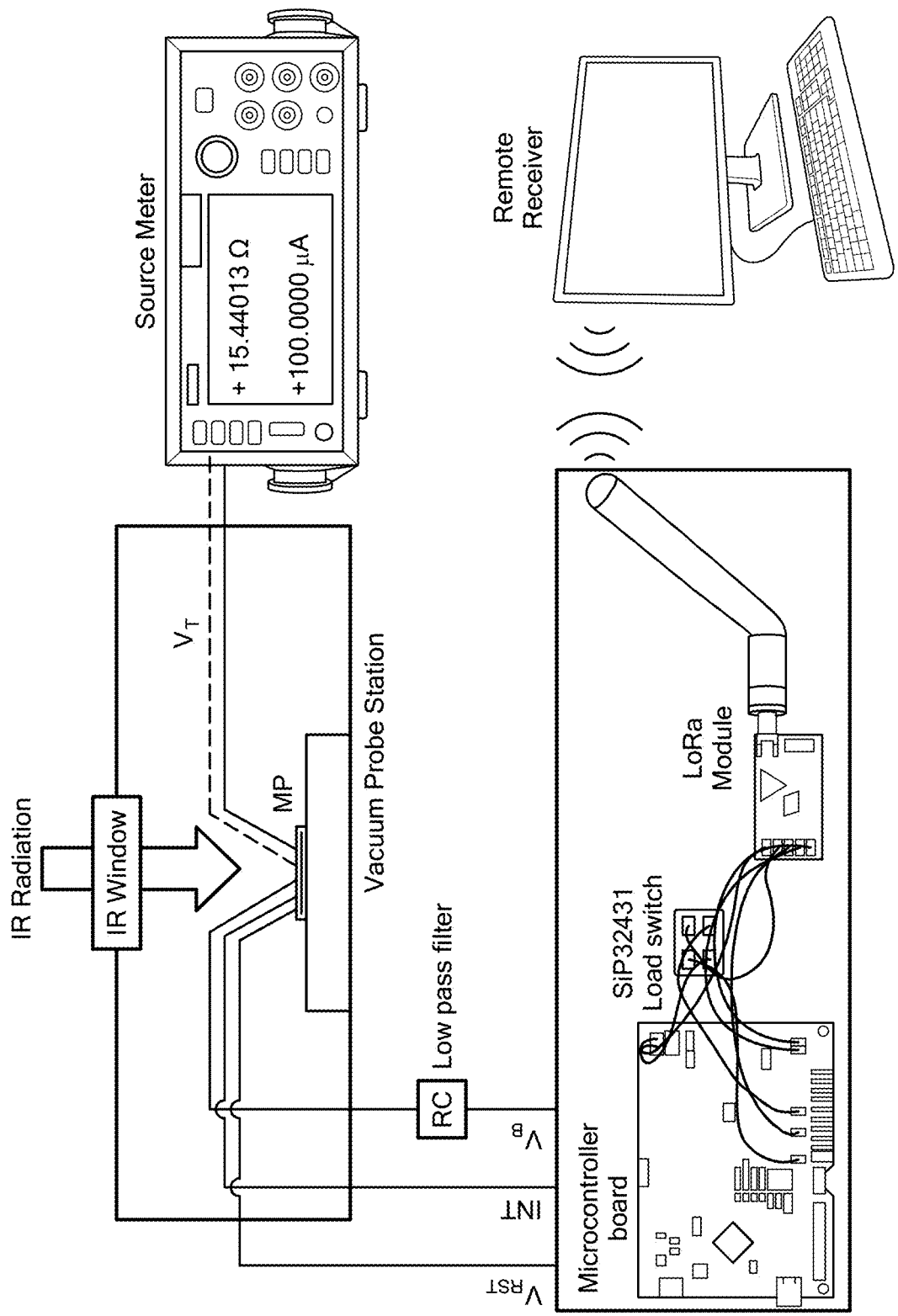
FIG. 5 shows an example experimental setup used to test a sensor device prototype wherein the remote receiver is connected to a laptop about 5 meters away from the transmitter.

The devices and methods are tested herein. Prototype testing illustrated in FIG. 5 is discussed in more detailed examples below, along with detailed data in FIG. 6, FIG. 7A, FIG. 7B, and FIG. 8. An example MP including cantilevers is further detailed in FIG. 9. In this example, the MP is plasmonically activated by impinging electromagnetic radiation within a specific spectral wavelength band (or a broadband) at head 21. In FIG. 9, the MP includes of two symmetric released cantilevers facing each other: first cantilever 20 and second cantilever 30. Each cantilever can include a head (21, 31); an inner, thermally sensitive pair of bimaterial legs (23, 33), bottom insulating later 71 and top conductive layer 73; an outer temperature and stress compensating pair of bimaterial legs (25, 35) connected to the substrate (surface 24); and a pair of thermal isolation regions (27) between the bimaterial legs. The head (reflector head) of the second cantilever can include a metal-insulator-metal structure that reflects any impinging IR radiation (e.g., a relatively thick top metal layer that acts as a mirror). The head of the first cantilever carries the electrically floating metal tip (top contacting metal or contact element 1). The first cantilever head (absorber head 21) can include a metal-insulator-metal structure in which the top metal layer (65) is patterned to form an array of plasmonic nanostructures that enable strong absorption of EM radiation in the sub-wavelength structure (plasmonic absorber 67). Examples of metamaterial plate 60 having bottom metallic layer or metallic base layer 61, top insulating layer 63, patterned metallic structures 65 are also illustrated.

Micromechanical cantilever-based switches are described in the examples of published patent documents WO 2020/150732 A1, WO 2017/082985 A2/3, WO 2020/150743 A1 and US 2020/0116694 A1, each of which is incorporated by reference herein in its entirety. As discussed above, plasmonic absorbers can be applied in a variety of spectral regions (e.g., Cui, et al., 2014). The technology contemplates future designs of absorbers and components sensitive to a large variety of input signals, enabling deployment of the sensor devices to far reaches to detect environmental events, to quantify the events, and to transmit back the nature of observations and/or quality data about the status of the sensor.

The switches of the technology discussed herein can be any size and can be designed to have one or more components that move or change in response to any input signal. The switches can be single pole, double pole, triple pole, or quadrupole pole switches, or in a range from 5 or greater poles. The switches can be single throw, double throw, triple throw, quadrupole switches, or in a range from 5 or greater throws. The switches can be 3-way switches, 4-way switches, or in any combination, for example, for detection and for quantification of complex environmental events.

The Vmax utilized to place the switch into a standby state, while the switch monitors for an input signal, can be utilized to sensitize the switch to a specific detection threshold of the input signal. The Vmax utilized to place the switch into the standby state can vary depending on the configuration of the switch. For example, the Vmax can be greater than about a millivolt, greater than about $1/10$ V, greater than about 1 V, greater than about 3 V (e.g., transistor transistor logic, TTL, voltage), greater than about 5 V (TTL higher level), greater than about 10 V, or greater than about 50 V, or greater than about 100 V. Depending on the materials used to construct the switch and the switch configuration, the Vmax and the wake-up current can vary. Depending on the volts, pole(s) and/or throw(s) of the switch, the wake-up current can be greater than about 100 nA, greater than about 1 μA, greater than about 1 mA, greater than about $1/100$ A, greater than about $1/10$ A, greater than about 1 A, or greater than about 10 A. The sensor devices can be zero-power in the standby state, for example, when no clock is implemented in the microcontroller. In the standby state, the sensor devices can consume about ≤10 nW, about ≤100 nW, about ≤1 μW, about ≤10 μW, about ≤100 μW, about ≤1 mW, about ≤10 mW, or about ≤100 mW.

Applying the Vmax in the standby state can highly increase the sensitivity of a switch. The Vmax can be select to achieve a target sensitivity and a targeted detection threshold. For example, the sensitivity can be about 2X improved after applying Vmax, the sensitivity can be about 10X improved after applying Vmax, the sensitivity can be about 100X improved after applying Vmax, the sensitivity can be about 500X improved after applying Vmax, the sensitivity can be about 1000X improved after applying Vmax, the sensitivity can be about 10000X improved after applying Vmax.

The sensor devices can optionally include one or more refractive index shifters, plasmonic devices, lenses, packagings, polarizers or circular polarizers, EM filters, radomes, gyroscopes, spinning mechanics (e.g., gravitational force simulators), shutters, arrays, magnetics or magnetic materials, paramagnetics, lights, LEDs, blackbodies or emitters, photo-elastic modulators, lasers, radioactive isotopes, living cells or organisms, polymers, biomolecules, living cell responsive components, heaters, coolers, stabilizers, chemical or other biological reagents, other detectors, or combinations of these, any or other accessories. The example of the LoRa in FIG. 3 can be replaced with an LED, and the absorber head can be utilized to measure absorption of a medium between the LED and the absorber head. The example of the LoRa module in FIG. 3 can be replaced with a different light-emitting or other EM-emitting/radiation-emitting transmitter. Depending on the transmitter, the transmission range can be for a distance of longer than 5 kilometers (km), longer than 100 km, longer than 1000 km, or longer than 10000 km. One sensor device can be utilized to transmit and to activate another configured in series, to cover vast distances in series. The sensor devices can be fabricated at the macro, nano or micro-scale. For example, a sensor device of the technology can be deployed in a telescope in outer space, can rely on solar energy and/or energy storage, can include multiple sensors, and can transmit back on a regular or on an as needed basis. Micro or nano sensors can be deployed to covert locations. The sensor devices can be implantable. In another example, a micro-scale sensor device is implanted and detects pressure near a heart or an artery, transmitting when the pressure is too high along with magnitude of the pressure.

Another example is wherein the sensor devices are provided with circular polarization filters and utilized to detect and quantify levels of circular polarization in EM, for example, present in reflection nebulae in star formation regions. The sensor devices can be distributed over vast areas and used to triangulate a location of an event. For example, three or more sensor devices (or a plurality) are placed in a variety of locations in and around a city or a countryside and utilized to detect a possible radiation source or a transmission of EM. The magnitude and detection of the detected radiation/EM can be utilized to triangulate the exact location of the source.

The technology greatly improves security devices deployed throughout the world including those placed in remote locations. The sensor devices can be deployed to the bottom of a body of water to detect seismic or volcanic events, either on a submersible or in a container. Triangulation using the sensor devices can be used over vast distances covering different media (e.g., water, ground, air, environmental gases, space). Any materials/configurations can be utilized to fabricate the switches used in the technology, for example, materials can be selected for different temperatures, for extreme conditions and/or compensations. Living or biological materials can be included in the switches. The sensor devices can be configured for extreme cold (e.g., about 10 K), extreme heat (e.g., about above 1000° C.), for compensating vibration on a vehicle, for extreme pressure or for vacuum.

The sensor devices can be attached to endangered organisms (e.g., trees, plants or animals) and then utilized to detect activity of poachers, damage to a tree or plant, or unexpected animal migrations. The sensor devices can be utilized to detect growth of microorganisms or mutations in a growth.

In another example, a panel including an array of sensors with more than 10, more than 100, more than 1000, or more than 10-thousand sensor devices is provided. The array can have each sensor tuned to detect the same broadband frequency of EM or to the same spectral band, but with a different Vmax applied to each sensor. In this configuration, the array, with each Vmax different, can quickly provide a quantitative measurement because each sensor will have a different detection threshold. Only sensors having a lower detection threshold (compared to incoming input signal or RM) will be moved to the ON state. The resolution can be configured by the number of sensors in the array. The array can provide each sensor configured to a different spectral band; in this example, fast wide-range spectroscopy can be provided, again with peak resolution determined by the number of sensors in the array. The entire arrays can be ultra-low power, in a standby state, and only activate when above a detection threshold, when needed or for periodic checks if desired. Signal to noise and/or dynamic range can be tailored to previously unobtainable values, for example, by use of arrays in the examples discussed above. The arrays can be utilized to detect presence, quantity and size of dispersed particles in the surrounding area, for example, by particle diffraction of EM to one or more arrays.

The power supply included with the sensor devices can be a battery. The power supply can be a solar powered device. The power supply can include mechanical power generation (e.g., self-winding mechanisms deriving power from motion), power derived from temperature and/or phase transitions, power derived from EM, power from a change in a force or daily temperature fluctuations. The technology contemplates sources and/or combinations providing power for longer than 10 years for deployment and calibration checks of the sensor devices to remote locations.

Figure 10A:
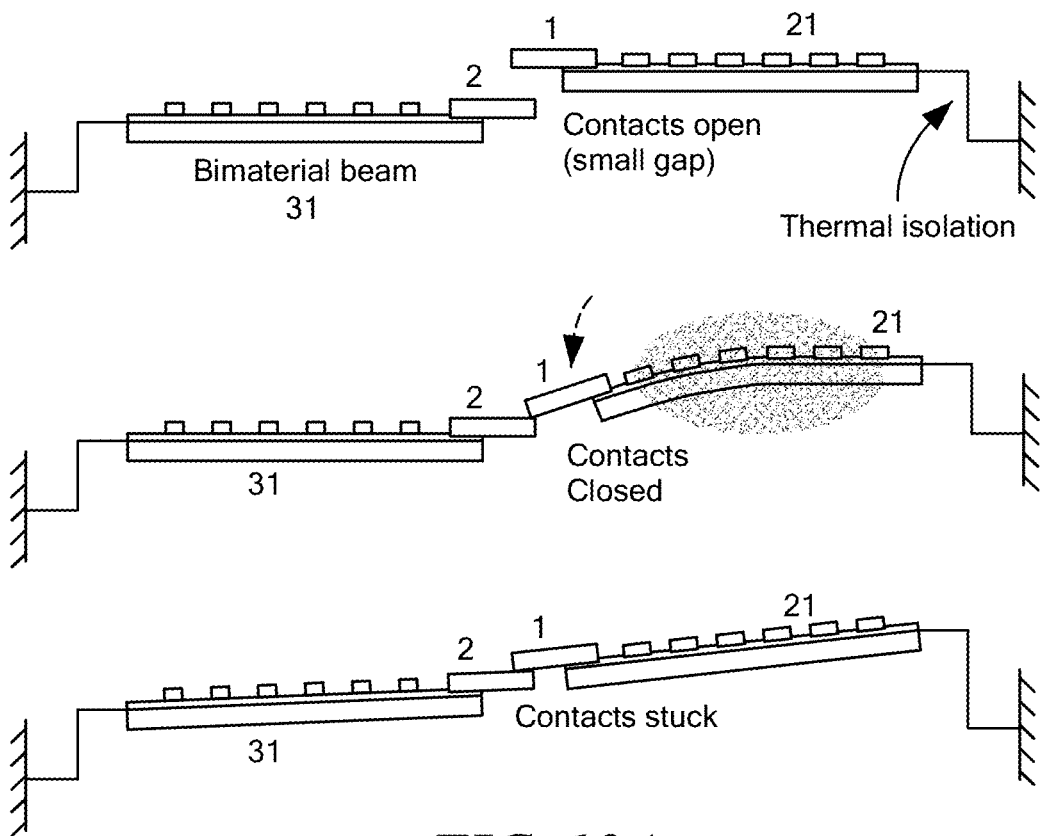
FIG. 10A illustrates a switch closing process in which the contacts close in response to electromagnetic radiation absorbed by one head, after which the contacts remain stuck together due to adhesive forces or due to latching together.

In an example demonstrated in FIG. 10A, the sensor devices can provide memory of input signals without the non-volatile memory in the microprocessor. In this example, the contacts remaining stuck together can provide a memory of an input signal. An additional sensor device can be utilized for quantitative analysis, with one device utilized for qualitative analysis and/or memory.

Figure 10B:
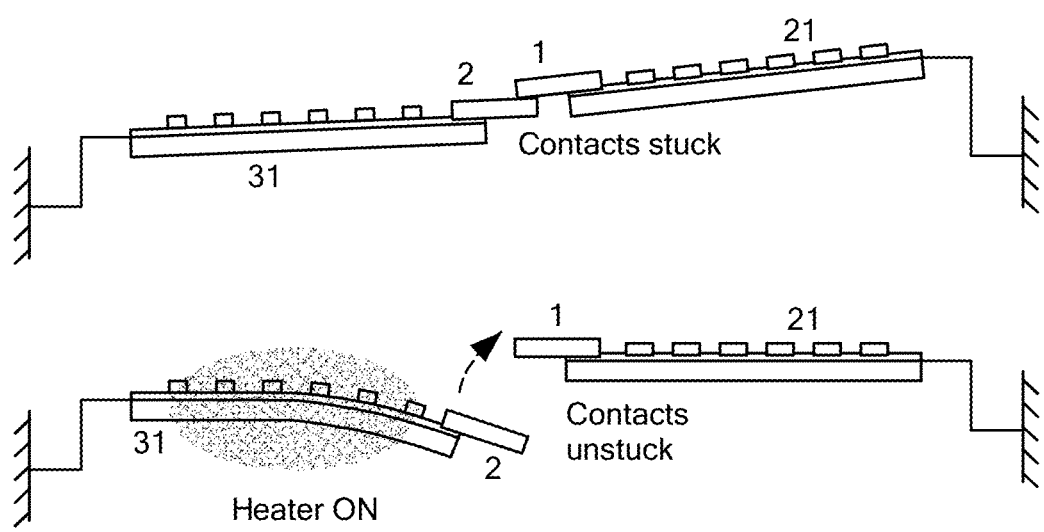
FIG. 10B illustrates a process of releasing the contacts through activation of an electrical heater in the other head of the device, causing the actuating beams to bend downward and to open the contact junction.

FIG. 10A illustrates a switch closing process in which the contacts (1 and 2) close in response to electromagnetic radiation absorbed by one absorber head 21, after which the contacts remain stuck together due to adhesive forces or due to latching together. FIG. 10B illustrates a process of releasing the contacts (1 and 2) through activation of an electrical heater in the other reflector head 31 of the device, causing the actuating beams to bend downward and to open the contact junction.

The stability of the switch can be measured over time by using the initial calibration curve (in memory) compared to a simulation calibration curve. As discussed above, the memory of the microcontroller can be zero-power and can hold multiple calibration curves. The microcontroller can hold many calibration curves, each for different magnitudes of EM or input signal, in the memory. A high-level calibration curve can be utilized, if necessary, or a low-level calibration curve can be utilized. In an example, a low-level calibration curve can be utilized to extend the lower range of the quantitative measurements.

Figure 11:
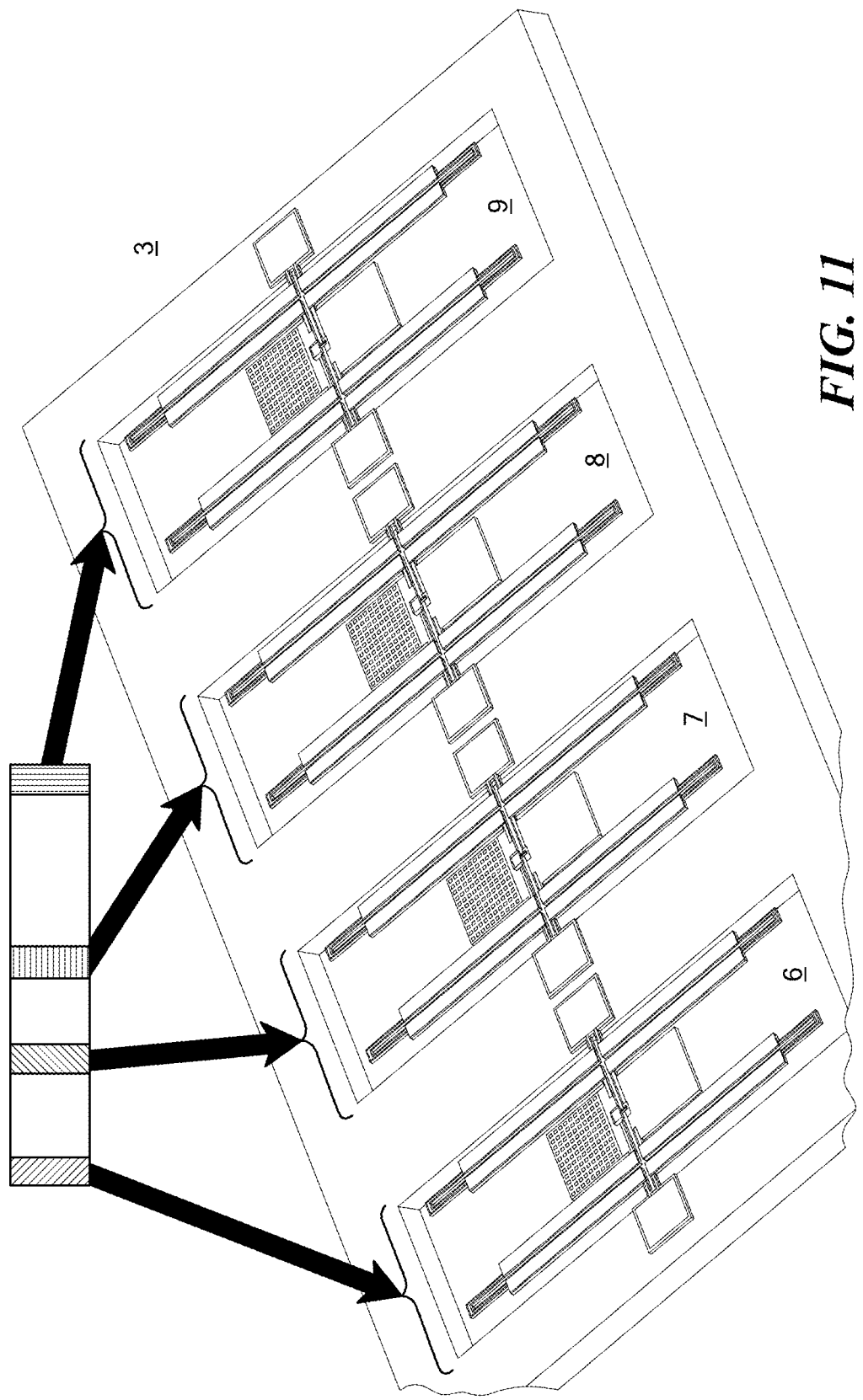
FIG. 11 illustrates a device including two or more MPs, each MP configured to a different spectral band selected for detection.

Two or more of the sensor devices can be implemented in various devices or arrays as illustrated in FIG. 11. In FIG. 11, sensor device 6, sensor device 7, sensor device 8, and sensor device 9 are each in a device 3 designed to measure more than one input signal. In another example, 6, 7, 8, and 9 are designed to measure the same or similar input signals, and the device 3 is deployed to an extremely harsh environment. In this example, if sensor device 6 is damaged, sensor device 7 can be activated. If sensor device 7 is damaged, sensor device 8 can be activated. The example in FIG. 11 can be configured in series, parallel, or a combination of both. The example in FIG. 11 can be a panel including an array of sensors with more than 10, more than 100, more than 1000, or more than 10-thousand sensor devices.

The sensor devices can be included, for example, in a consumer product for dispensing or for sensing presence of a hand (e.g., a soap dispenser or towel dispenser), a smoke detector, exhaust heat detector, a plume detector; a living organism detector, a proximity detector, an infrared detector, a visible light detector, a color detector, a security compliance detector, a pharmaceutical compliance detector, an activator device configured to activate a machine, and an electro-optical detector. The sensor devices can be deployed into space, in floors, on ceilings, on roofs, sides of buildings, vehicles, or implanted, for example. In another example, the sensor devices can be deployed by drones, aircrafts, projectiles, or the sensor devices can be carried on living organisms.

Figure 12:
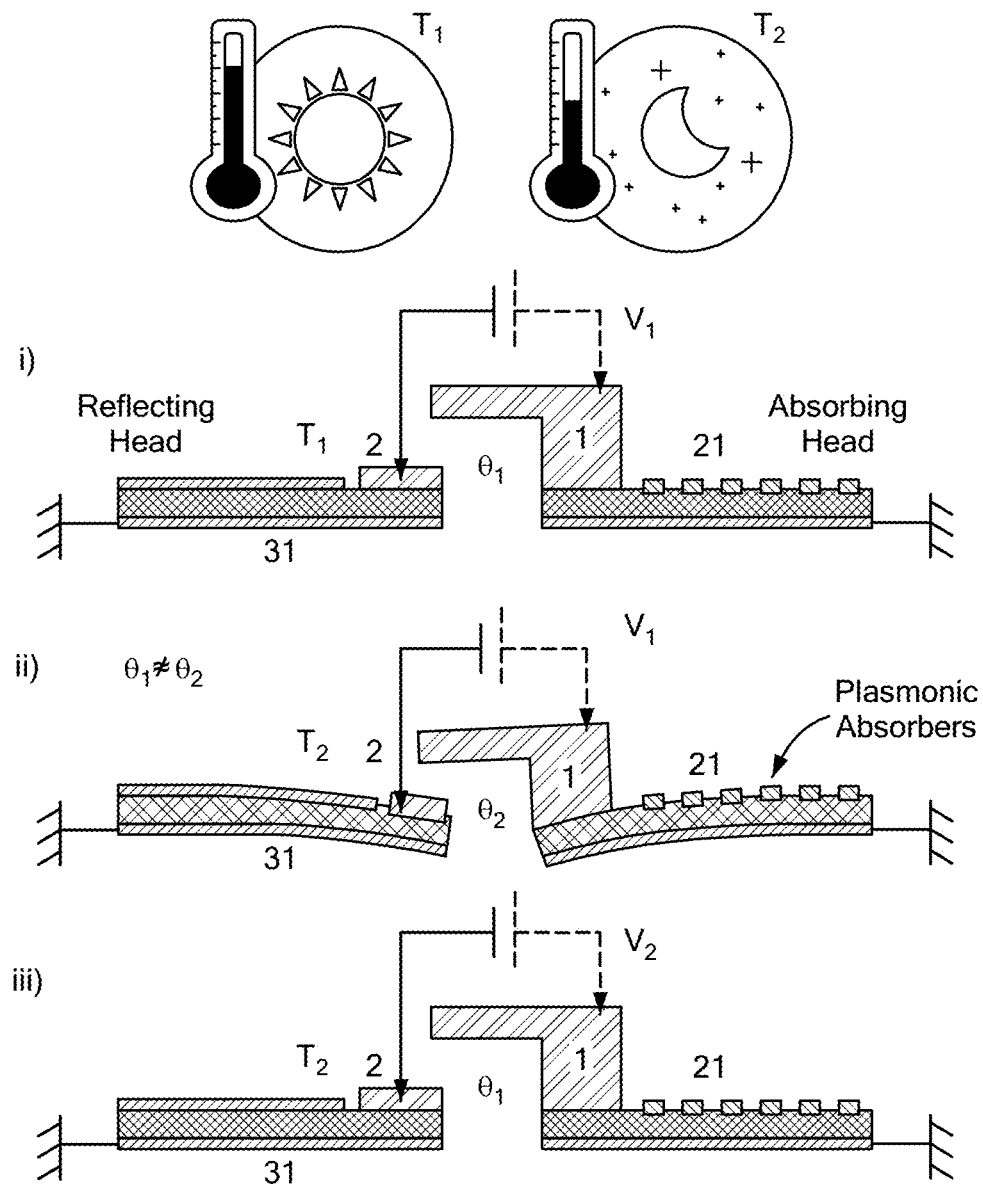
FIG. 12 shows a schematic of a sensor with temperature compensation using a dynamic biasing method.

Wildfires are significant ecological threats to national forests with increasing frequency and severity. In addition to prevention methods, 24/7 surveillance for early detection enables extinguishing the fire before it reaches large areas or populated areas. For an open-space fire detection, flame detectors are more suitable than the most common smoke detectors since there is no accumulation of smoke particles. Continuous monitoring in remote environments requires the flame detectors to be cable-free and to work without range reduction in changing ambient conditions with minimum maintenance. However, the state-of-the-art flame detectors based on pyroelectric IR sensors require complex read-out circuitry which is highly affected by the temperature induced noise above 60° C. (InfraTech). Moreover, they continuously consume electrical power, draining limited battery supply, making them unsuitable for deployment in hard-to-reach areas where frequent battery replacement isn't available. Event-driven, maintenance-free IR detectors for long range fire detection (~70 m for industry-standard heptane pan-fire) has been demonstrated with ultra-wide field-of-view)(~125° for large areal-coverage (Calisgan, et al., 2021). In Example 2, the ambient temperature response of a presently disclosed sensor device is measured under different bias conditions then, a new concept is demonstrated, dynamic biasing, that enables temperature-independent device operation between about −35° C. to about 85° C.) (FIG. 12).

Example 3 presents a demonstration of multi-band detection configured to reject false stimuli. Flame has high intensity IR radiation around 2.7 μm and 4.4 μm. By comparing multiple wavelengths, false alarms are decreased and specificity to flame is increased. False alarms can arise, for example, by a combination of sun and proximity of a living mammal or human. This example can be applied to other combinations of wavelengths and with larger arrays to provide specific detection of targeted wavelengths. Large arrays can be utilized as discussed above.

The sensor devices can be programmed, with instructions held in zero-power nonvolatile memory, to control complex tasks after activation or wake-up. The programming can be changed or modified by receipt of instructions/commands from a wireless receiver connected to the microcontroller.

The microcontroller demonstrated herein is an example of an ultra-low power device with a processor, non-volatile long-term memory, A/D conversion, multiple input/output, and optional clock. The methods described herein can be implemented alone or in combination using any suitable computing system. The computing system can be implemented as or can include a computer device that includes a combination of hardware, software, and firmware that allows the computing device to run an applications layer or otherwise perform various processing tasks. Computing devices can include without limitation personal computers, workstations, servers, laptop computers, tablet computers, mobile devices, wireless devices, smartphones, wearable devices, embedded devices, microprocessor-based devices, microcontroller-based devices, programmable consumer electronics, mini-computers, main frame computers, and the like and combinations thereof.

Processing tasks can be carried out by one or more processors. Various types of processing technology can be used including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, scripts, drivers, objects, components, data structures, and the like that perform particular tasks or operate on data.

Processors can include one or more logic devices, such as small-scale integrated circuits, programmable logic arrays, programmable logic devices, masked-programmed gate arrays, field programmable gate arrays (FPGAs), application specific integrated circuits (ASICs), and complex programmable logic devices (CPLDs). Logic devices can include, without limitation, arithmetic logic blocks and operators, registers, finite state machines, multiplexers, accumulators, comparators, counters, look-up tables, gates, latches, flip-flops, input and output ports, carry in and carry out ports, and parity generators, and interconnection resources for logic blocks, logic units and logic cells.

The computing device includes memory or storage, which can be accessed by a system bus or in any other manner. Memory can store control logic, instructions, and/or data. Memory can include transitory memory, such as cache memory, random-access memory (RAM), static random-access memory (SRAM), main memory, dynamic random-access memory (DRAM), block random-access memory (BRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), one-time programmable non-volatile memory (OTPNVM), hard disk drives, optical storage devices, compact disc drives, flash drives, floppy disk drives, magnetic tape drives, memory chips, and memristor memory cells.

Non-volatile random-access memory (NVRAM) is random-access memory that retains data without applied power. This is in contrast to dynamic random-access memory (DRAM) and static random-access memory (SRAM), which both maintain data only for as long as power is applied, or forms of sequential-access memory such as magnetic tape, which cannot be randomly accessed but which retains data indefinitely without electric power.

Ferroelectric RAM (FeRAM, F-RAM or FRAM) is a random-access memory similar in construction to DRAM but using a ferroelectric layer instead of a dielectric layer to achieve non-volatility. FeRAM is one of a growing number of alternative non-volatile random-access memory technologies that offer the same functionality as flash memory. An F-RAM chip contains a thin film of ferroelectric material, often lead zirconate titanate, commonly referred to as PZT. The atoms in the PZT layer change polarity in an electric field, thereby producing a power-efficient binary switch. However, the most important aspect of the PZT is that it is not affected by power disruption or magnetic interference, making F-RAM a reliable nonvolatile memory. FeRAM's advantages over Flash include lower power usage, faster write performance and a much greater maximum read/write endurance (about greater than 1000). FeRAMs have data retention times of more than 10 years at +85° C. (up to many decades at lower temperatures). Market disadvantages of FeRAM are much lower storage densities than flash devices, storage capacity limitations and higher cost. Like DRAM, FeRAM's read process is destructive, necessitating a write-after-read architecture.

Non-transitory memory can be provided on a removable storage device. A computer-readable medium can include any physical medium that is capable of encoding instructions and/or storing data that can be subsequently used by a processor to implement embodiments of the systems and methods described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in the systems and methods described herein.

The computing device can include one or more input/output interfaces for connecting input and output devices to various other components of the computing device. Input and output devices can include, without limitation, keyboards, mice, joysticks, microphones, cameras, webcams, displays, touchscreens, monitors, scanners, speakers, and printers. Interfaces can include universal serial bus (USB) ports, serial ports, parallel ports, game ports, and the like.

The computing device can access a network over a network connection that provides the computing device with telecommunications capabilities. Network connection enables the computing device to communicate and interact with any combination of remote devices, remote networks, and remote entities via a communications link. The communications link can be any type of communication link including without limitation a wired or wireless link. For example, the network connection can allow the computing device to communicate with remote devices over a network which can be a wired and/or a wireless network, and which can include any combination of intranet, local area networks (LANs), enterprise-wide networks, medium area networks, wide area networks (WANS), virtual private networks (VPNs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission to and receipt of data via the communications link. A transceiver can include one or more devices that both transmit and receive signals, whether sharing common circuitry, housing, or a circuit board, or whether distributed over separated circuitry, housings, or circuit boards, and can include a transmitter-receiver.

The computing device can include a browser and a display that allow a user to browse and view pages or other content served by a web server over the communications link. A web server, sever, and database can be located at the same or at different locations and can be part of the same computing device, different computing devices, or distributed across a network. A data center can be located at a remote location and accessed by the computing device over a network. The computer system can include architecture distributed over one or more networks, such as, for example, a cloud computing architecture. Cloud computing includes without limitation distributed network architectures for providing, for example, software as a service (SaaS).

EXAMPLES

Example 1. Wireless IR Sensor with Above-Threshold Measurement Function Based on a Bistable Micromechanical Switch To demonstrate an IR-triggered wake-up and the analog measurement function, a sensor was tested using the experimental setup shown in FIG. 5. The tested MP was utilized with a vacuum environment for high thermal sensitivity, and it was placed in a vacuum probe station having an IR transparent window and was connected through probes to the microcontroller placed outside.

There are two ways to provide thermal power input to the MP absorber head: by applying a voltage to the embedded heater (VT); or by exposing the absorber to IR radiation. Here both methods were demonstrated. Input through electrical heating allows for relatively quick and accurate characterization of the sensor and this was done using a source meter (Keithley 2450) applying a voltage VT to the heater RT. The threshold for the device with a bias of 3.3 V was first found (~260 nW) and then the input power was increased while recording the duty cycle reported by the sensor through the remote receiver display (this uses another LoRa-microcontroller programmed to receive and display the data on a computer monitor).

A microcontroller development kit (MSP-EXP430FR2433) was used in this prototype demonstration. The microcontroller was powered by a source meter set to source 3.3 V and measure current. In a real-world scenario, a CR2032 lithium coin battery would be sufficient to power the system. The LoRa wireless module here was connected through the load switch to a separate 5V supply on the board that allowed a higher current draw required by the module. In practice, it can be powered by the same coin battery as well.

Another experiment was done to demonstrate the sensor for a practical IR sensing application. Here, the IR radiation emitted by an open flame from a handheld lab butane torch (flame size ~2.5 cm×10 cm) was used as an input to the MP (directed into the probe station through the IR window). Here a different MP designed to absorb the narrowband IR emitted by the flame around 4.5 μm was used. The sensor's response was recorded on the receiver as the flame's distance was varied.

Figure 6:
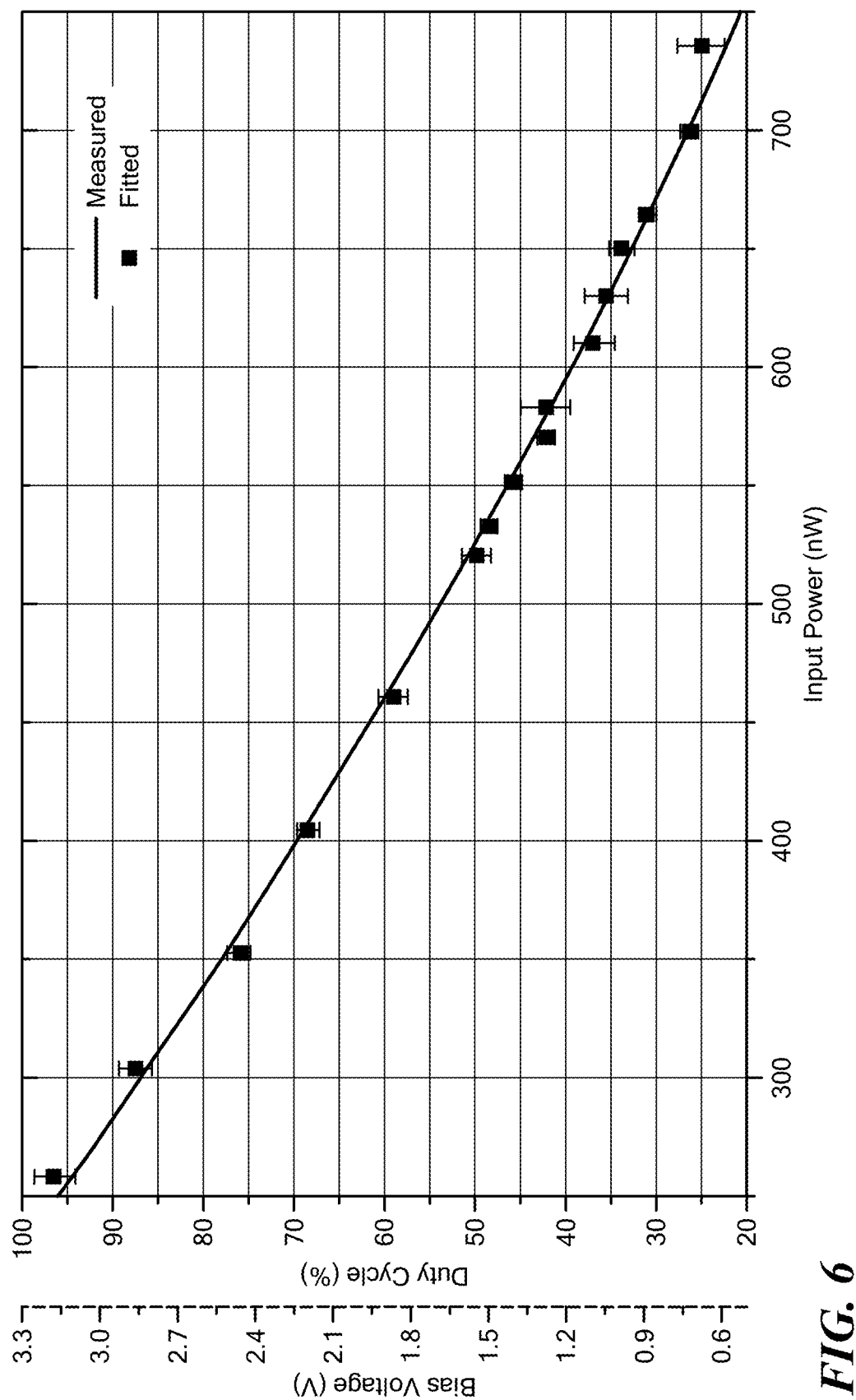
FIG. 6 shows a graph showing the duty cycle values reported by the sensor system (as points on the graph) as the input power (X-Axis) is varied. The far-left Y-Axis is labeled as the voltage bias value (converted from the duty cycle). The fitted curve is shown on the graph.

FIG. 6 shows the results for the sensor characterization utilizing the pull-in-based input measurement technique. A clear dependence of the sensor-reported duty cycle on the applied input power was observed. Each data point was averaged over ten readings. A curve fitting using Equation (1) (shown above) was done (VPI=4.8 V; P0=1031 nW) and as shown, the resulting curve closely matches the measurement data points, thus validating the model and the proposed measurement method. The relationship is nearly linear, with a sensitivity of 0.16% duty cycle/nW (5.28 mV/nW) in the mid-range.

Figures 7A, 7B:
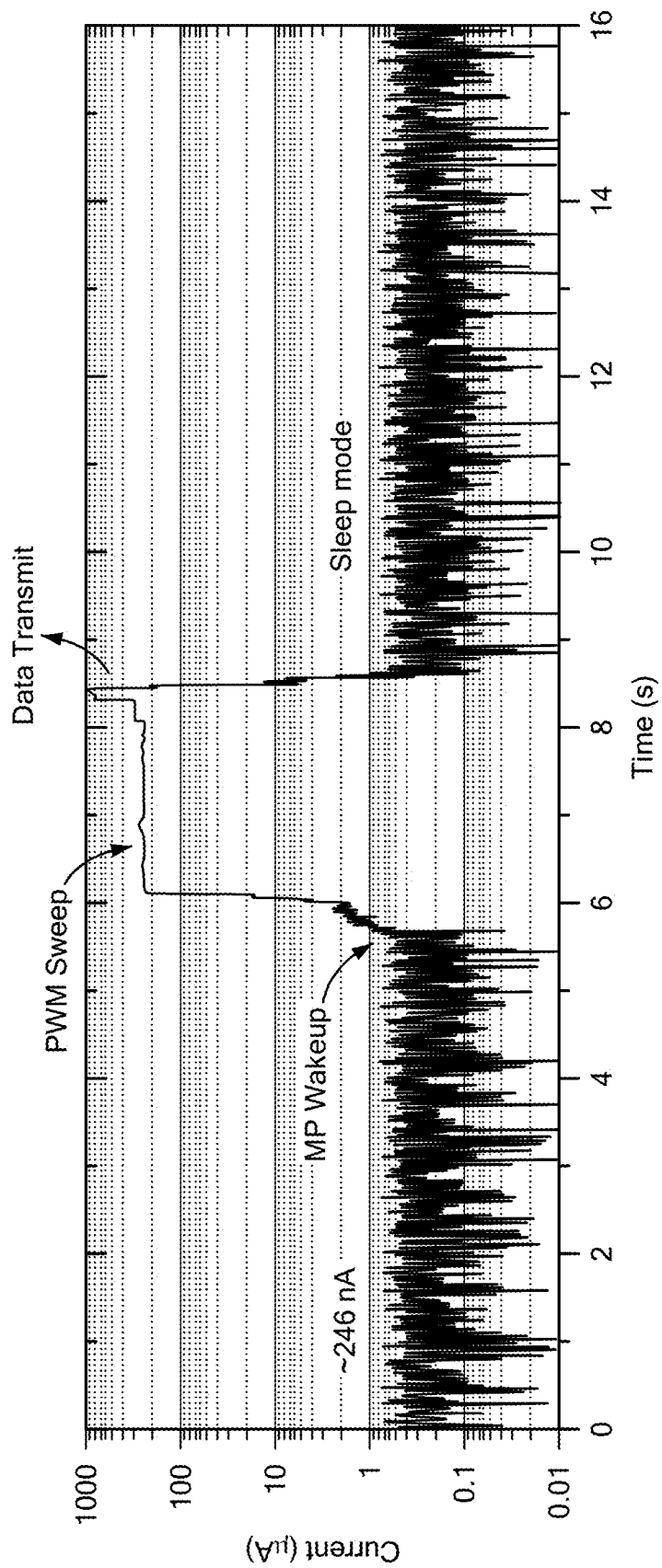
FIG. 7A shows a graph of measured current during standby and during an MP-triggered wakeup.
FIG. 7B shows a sample screenshot of the receiver display window when it receives data from the wakeup event.

FIG. 7A shows the measured current in the sleep mode and active mode after wakeup by the MP. An average standby current of ~246 nA was recorded with a maximum current of ~900 μA in the active mode. However, this includes only the current drawn by the microcontroller; the wireless module, powered separately was measured to draw a current of ~14.5 mA when transmitting. This translates into a standby power of only ~811 nW at standby and ~73 mW when transmitting. Such a low standby power consumption was only made possible by the use of an MP as the IR sensor; any other type of sensor would have had a significantly higher amount of standby power consumption.

Based on the formula in Szyk, for a 220 mAh coin cell, a lifetime of 15.9 years is expected with a detection frequency of thrice a day and a wakeup duration of 2 s. This is already more than the typical 10-year shelf life of the battery itself. The ultimate battery lifetime thus would be determined based on the frequency of detection events. Note that the speed of PWM sweep was intentionally set to be slow for the recording of wakeup current (since the source meter has a limited measurement speed). In practice, the total active duration would only be limited by the first reset upon wakeup: After reset, the microcontroller waits for the reflector side cantilever to return to its original position before starting the sweep, which takes around ~0.6 s (i.e., the thermal time constant). Since the capacitance between the contacts is very small (~fF), the time constant of RC filter can be much smaller to allow a faster sweep. FIG. 7B shows a screenshot from the receiver for a wakeup from above-threshold input power.

Figure 8:
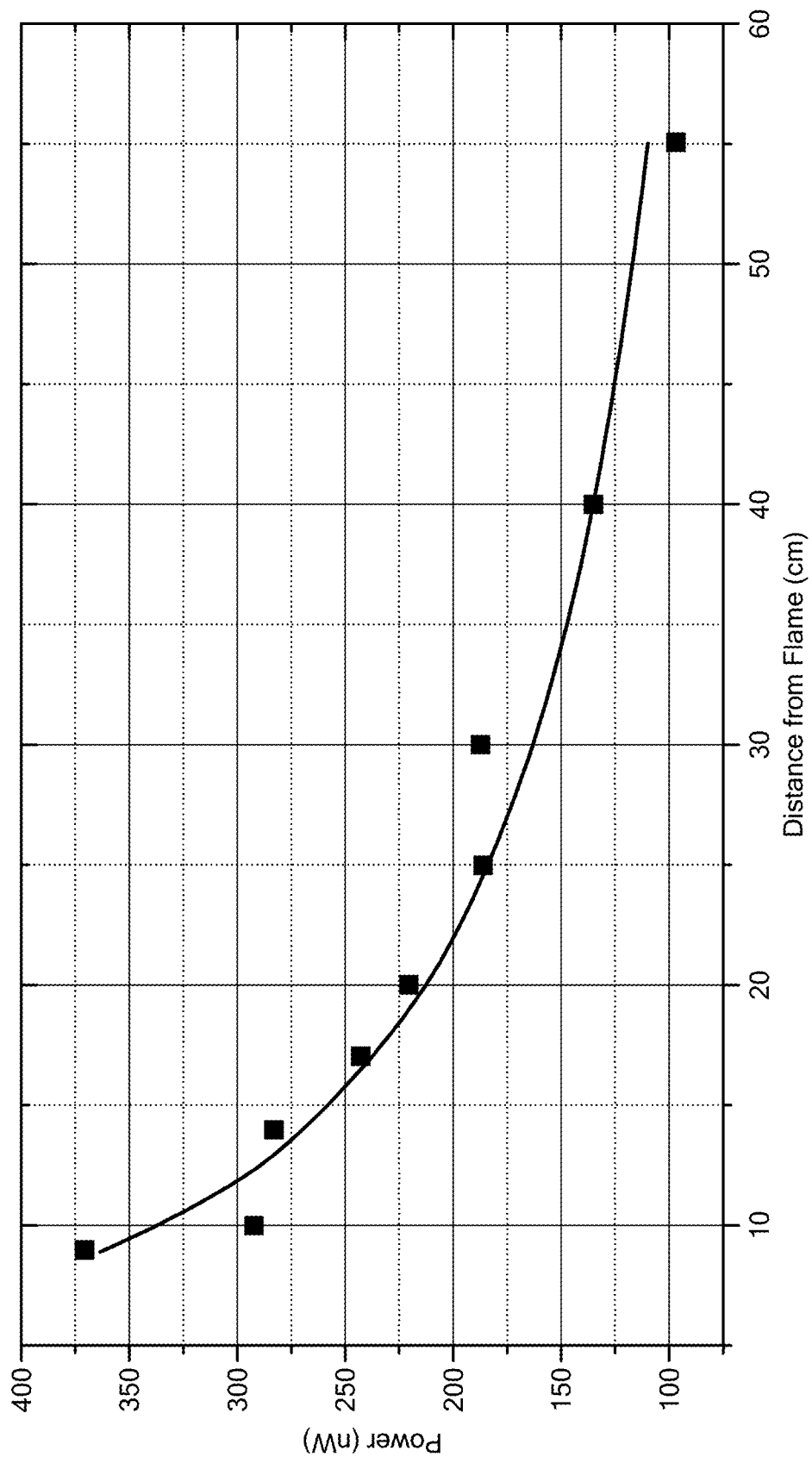
FIG. 8 shows a graph including the estimated absorbed power upon exposure to IR from a flame placed within the range of detection of a sensor device. The fitted curve is shown following an inverse square law-type as predicted in Equation (1) below.
Figure 9:
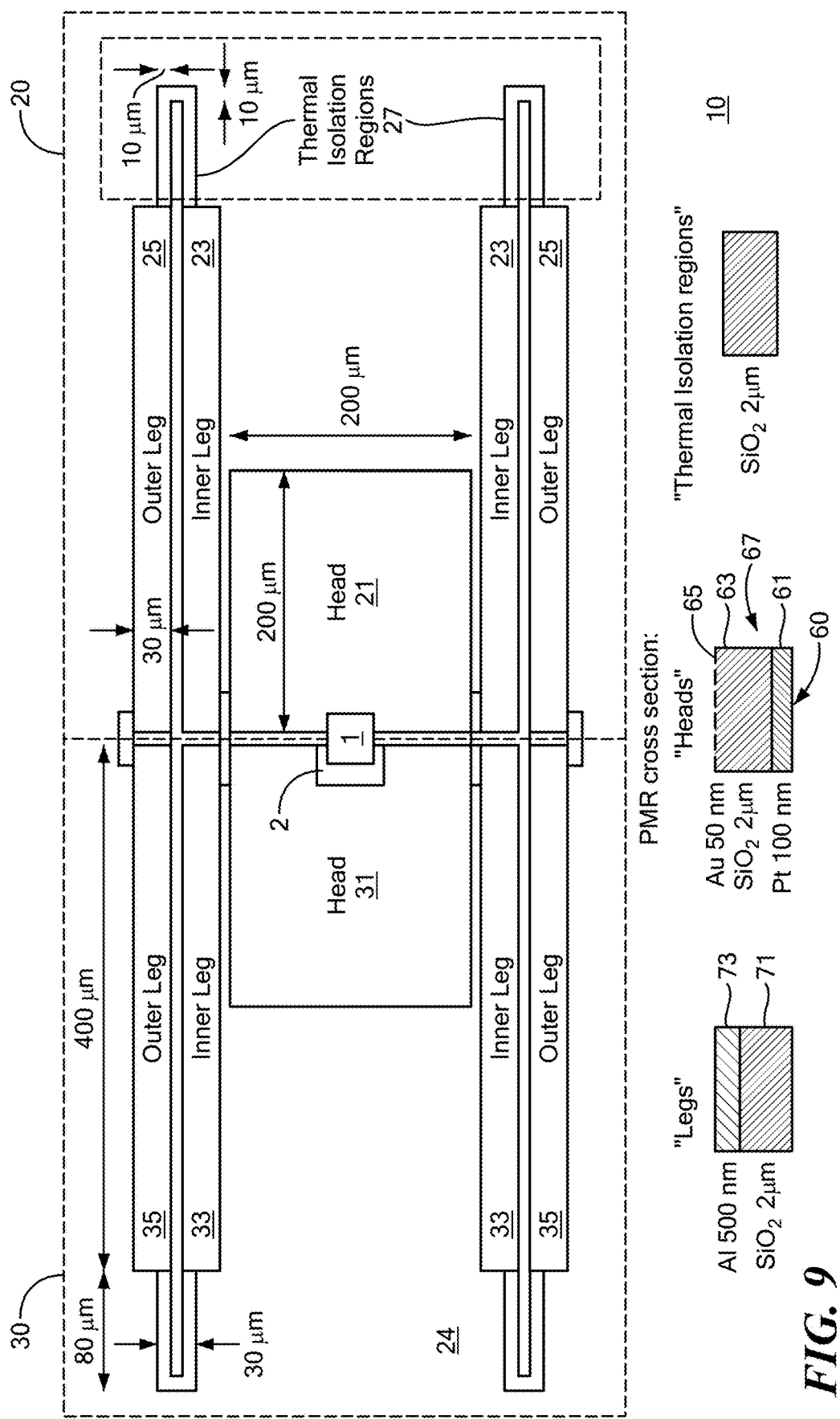
FIG. 9 shows a schematic illustration of an MP including two heads, a contact element 1 and a source electrical contact 2, with detailed elements of the cantilevers.

FIG. 8 shows the results of the IR sensing test using the butane flame as the radiation source. Here the duty cycle reported by the MP to the receiver was converted to a power value using the MP's calibration curve. As expected, the estimated power value decreases exponentially as the flame distance increases. The sensor remained in the low power sleep mode until the flame was ignited and was within the threshold distance (55 cm).

In summary, a sub-µW standby power wireless sensor system with integrated IR measurement capability was demonstrated. The sensor employs a zero power always-alert MP that detects the presence of above-threshold IR radiation and wakes up a microcontroller when triggered. The same MP was then leveraged to determine the level of input power that triggered it using a thermally modulated pull-in mechanism. The MP-based wakeup and subsequent measurement function was demonstrated along with an example of a practical use-case of flame detection. The ultra-low standby power capability combined with spectral selectivity, and measurement functions promises to usher a new age of high density, high coverage wireless remote sensor networks with robust, false-alarm-free IR sensor nodes that require no maintenance and can be functional for 10's of years, limited only by the shelf life of the battery itself.

Example 2. Temperature Compensation with Dynamic Voltage Biasing

Figure 14:
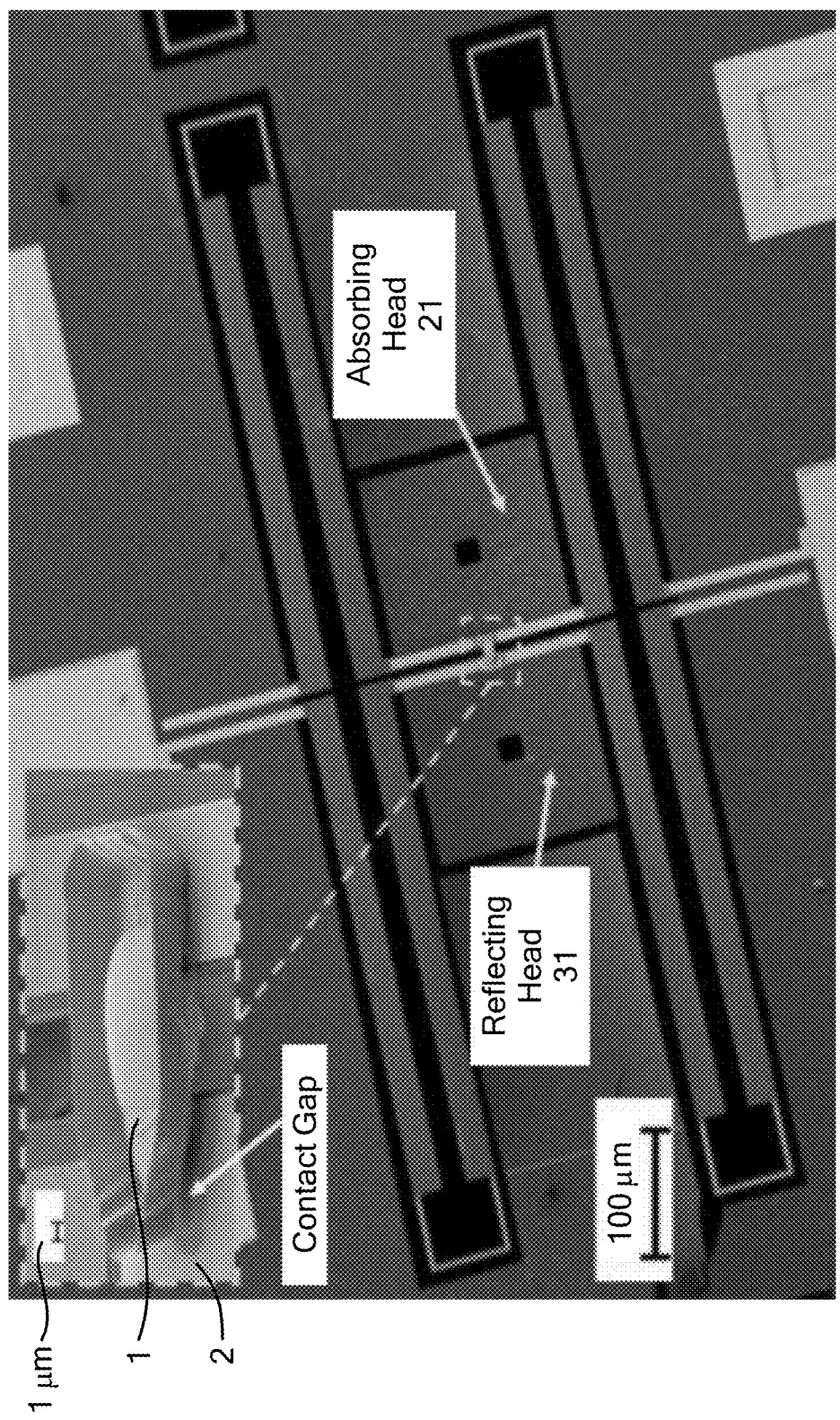
FIG. 14 shows a scanning electron microscope image of an MP with a close-up view (upper left) of the gap between contact element 1 and a source electrical contact 2. The scale bar in the close-up view is 1 µm.
Figure 17:
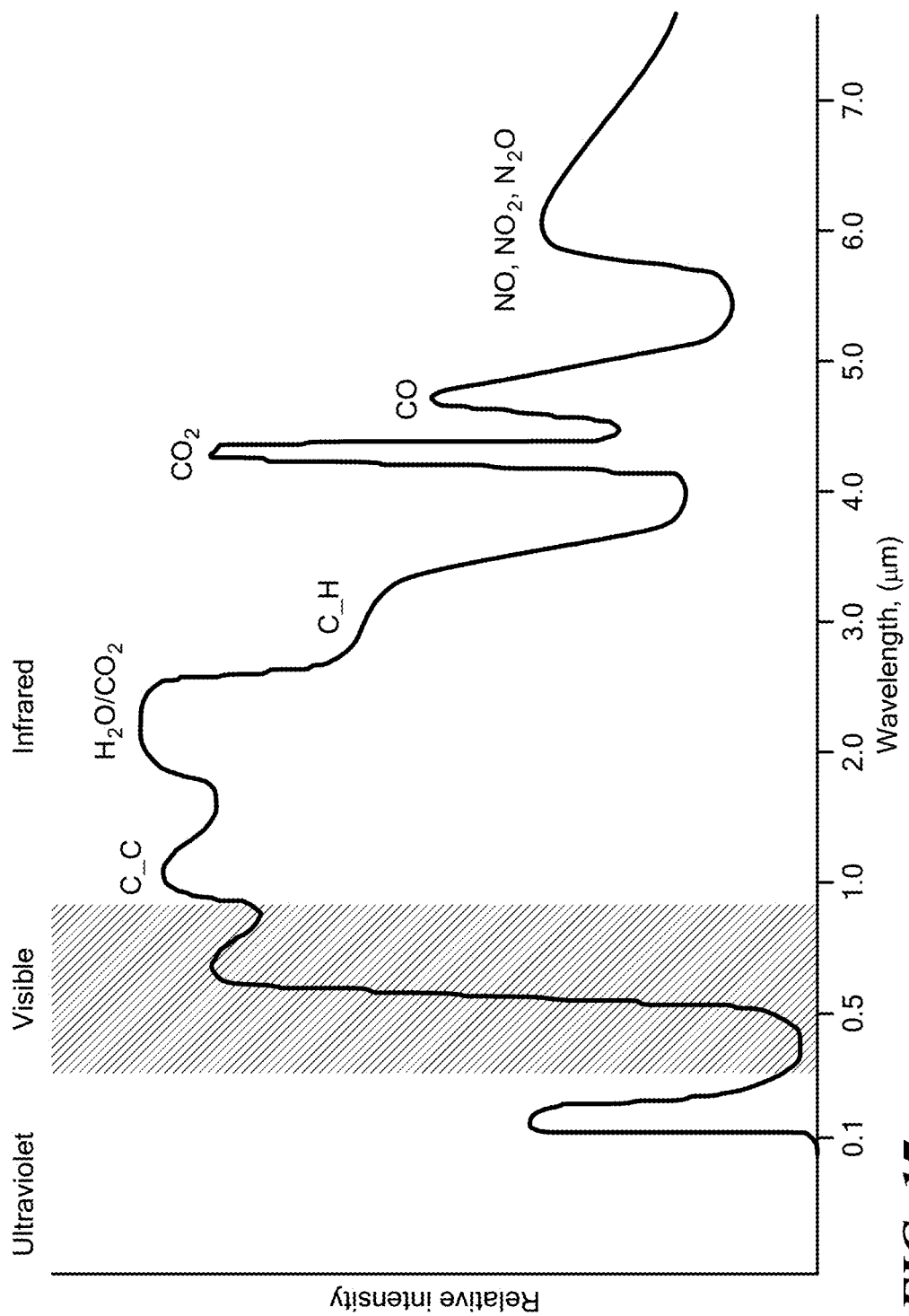
FIG. 17 shows a plot of spectral emissions from a gasoline fire.

First, the ambient temperature response of a sensor was analyzed under different bias conditions. Then, a new concept was surprisingly tested, dynamic biasing that enables temperature-independent device operation between −35° C. to 85° C. The concept was illustrated in FIG. 12. The schematic in FIG. 12 shows the detector at top at temperature $T_1$ with bias voltage of $V_1$ resulting in threshold of $\theta_1$. FIG. 12 at center shows the detector at temperature $T_2$ with bias voltage of $V_1$ where the device experiences different threshold of $\theta_2$. The different material stack in the opposite heads and unsymmetrical fabrication mismatches create uneven thermal expansion affecting the contact gap. FIG. 12 at bottom shows the detector at temperature $T_2$ with adjusted bias voltage of $V_2$ to keep the threshold level at $\theta_1$ which enables temperature independent flame detection performance at different ambient conditions. The core element was a plasmonically-enhanced micromechanical switch (PMP) (Qian, et al., 2017) that included a symmetric pair of thermal actuators (legs), a reflector head, and an absorber head carrying the contact tip. A scanning electron microscope image of the PMP is shown in FIG. 14 with a close-up view of the contact gap at the upper left of the image. The core sensing element of the flame detector is the plasmonically-enhanced micromechanical photoswitch (PMP) that harvests infrared (IR) energy from a hydrocarbon flame through a spectrally selective IR absorber to generate a wake-up signal without relying on active electronics (hence zero standby power consumption). As an example of flame emissions, FIG. 17 shows a plot of an emission spectrum from a gasoline fire with spectral features labeled (Liu, et al., 2007).

The device employed folded beam structures that mitigated the ambient temperature dependence due to the movement of the thermally sensitive bimaterial legs. However, since the material stacks were not identical for absorber and reflector heads, their displacement for a change in temperature was uneven, such that the contact gap height and ultimately the device threshold (IR power to close the gap) varied with changing ambient conditions. This issue was solved by measuring the pull-in voltage of the device and adjusting the bias voltage accordingly such that the threshold is kept constant at all temperatures without using an external temperature sensor.

Figure 15A:
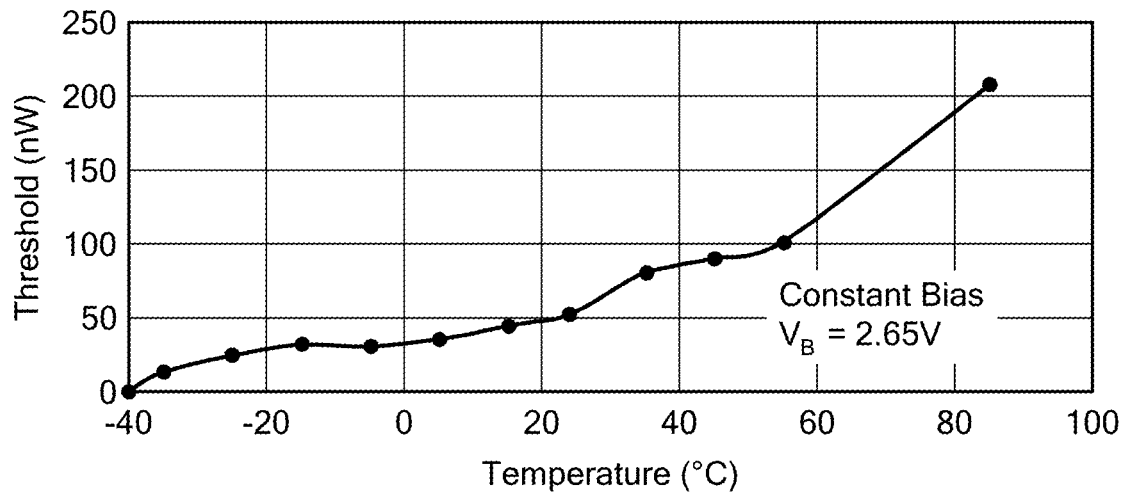
FIG. 15A shows a plot of measured power absorption (Threshold on y-axis) to close the switch's electrical contacts at a constant bias of 2.65 V in the temperature range of −40° C. to 85° C. (on x-axis).
Figure 15B:
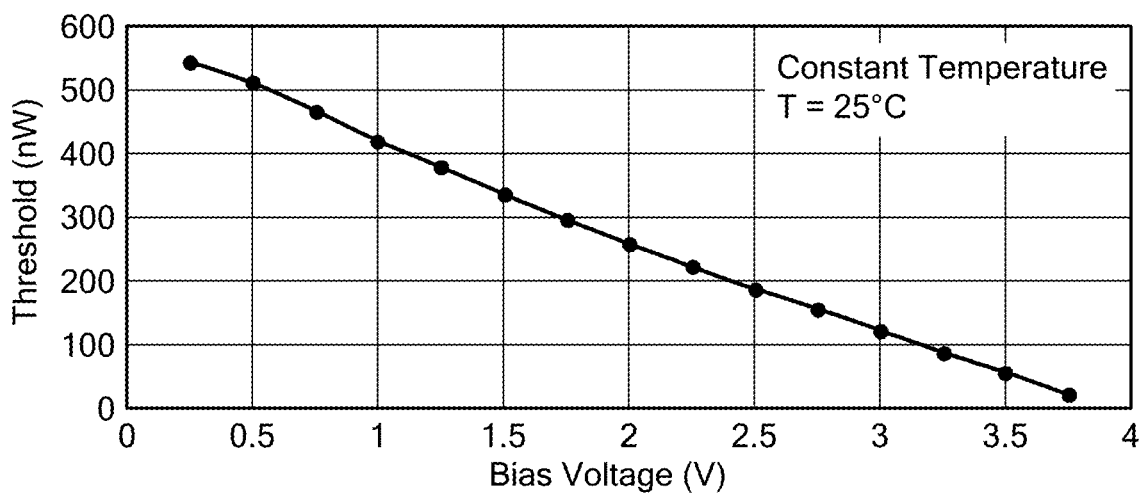
FIG. 15B shows a plot of measured power absorption (y-axis) to close the switch's electrical contacts at a constant temperature of 25° C. under various bias voltages shown on the x-axis.

The PMP was tested in a vacuum chamber with temperature control unit facing a micro-torch flame through a 45° angled mirror. The temperature dependency of the device threshold was characterized by built-in heater measurements (FIG. 15A, FIG. 15B) where a current-limited sourcemeter was connected to contacts to observe the tip current. FIG. 15A and FIG. 15B show measured power absorption to close the contacts of the switch. FIG. 15A shows at constant bias of 2.65 V in the temperature range of −40° C. to 85° C. where the pull-in voltage at −40° C. is 2.65 V, therefore no absorbed power was required to turn on the PMP at the low temperature −40° C. The required absorbed power increased with temperature due to increase in the contact gap. FIG. 15B shows at constant temperature of 25° C. under various bias voltages. The applied bias decreased the contact gap without disturbing the zero-standby power consumption. For both measurements, the absorbed power was calculated by Joule's heating of the embedded resistive heater structure (~60 kΩ) on the absorber head mimicking the IR power absorbed by the plasmonic absorbers.

Figure 16:
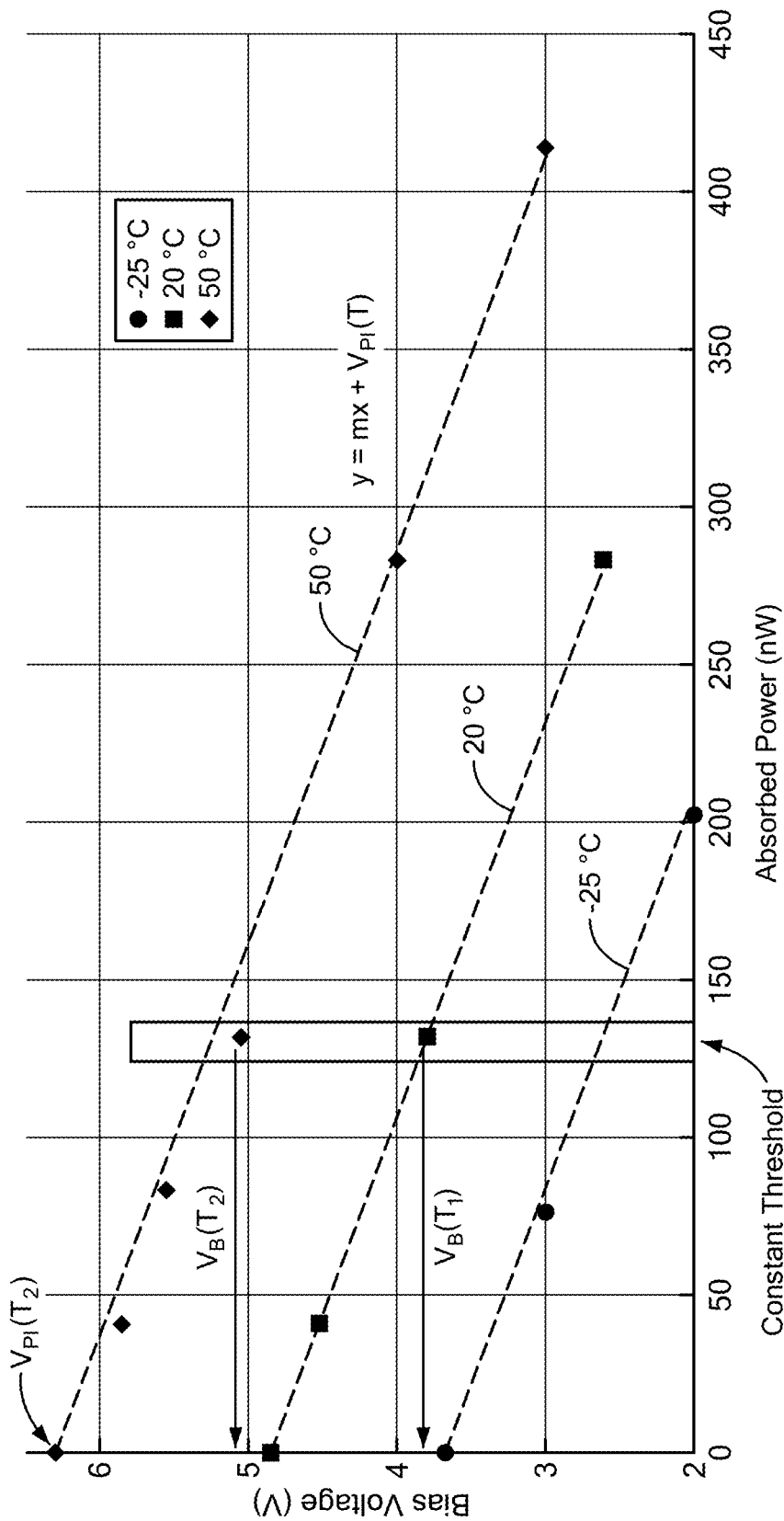
FIG. 16 shows an overlay plot of the the measured bias voltage (y-axis) versus absorbed power (x-axis) at various temperatures.

The linear relationship between threshold and the bias voltage was established ($y=mx+V_{PI}(T)$) with $V_{PI}(T)$, temperature dependent pull-in voltage and m, constant slope (FIG. 16). FIG. 16 shows the measured bias voltage versus absorbed power at different temperatures. The temperature dependency of the pull-in voltage was shown in y-axis values where no absorbed power was needed to close the contacts at respective temperatures. Linear approximation was used to fit the measurements that show temperature dependent pull-in voltage ($V_{PI}(T)$) and constant slope (a) as shown in the equation on FIG. 16. At any temperature, the fitting curve could be obtained from measured pull-in voltage and line slope at room temperature to obtain $V_B(T_2)$ for constant threshold operation. The temperature independent slope of the fitting curves enabled operation without the need of an external temperature sensor. The bias voltage at unknown temperature (i.e. $V_B(T_2)$) was calculated by $V_B(T_2)=V_B(T_1)-(V_{P1}(T_1)-V_{P1}(T_2))$ resulting in x19 less variation in flame detection distance compared to when constant bias voltage was applied over temperature range of −35° C. to 85° C. (FIG. 13).

Figure 13:
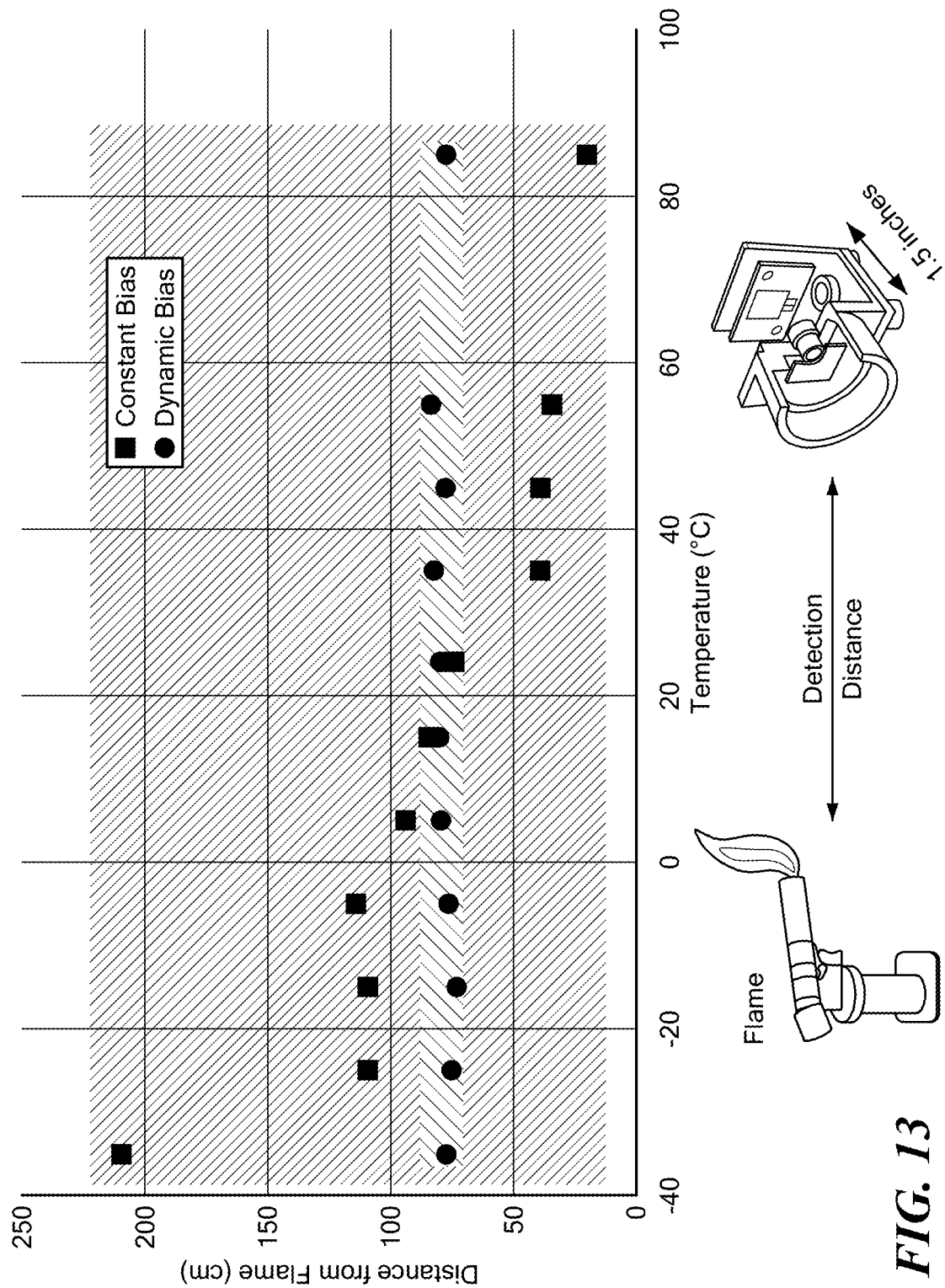
FIG. 13 shows a plot of flame detection measured with a constant voltage bias and with a dynamic voltage bias at various temperatures.

FIG. 13 compared the flame detection distance measured with constant voltage bias and dynamic voltage bias. The dynamic bias concept was implemented to counterbalance the effect of temperature and keep the detection distance (about 80 cm) at the same level as room temperature conditions, and x19 less variation was observed in the detection distance using the dynamic voltage biasing. In the constant and dynamic bias experiments, bias voltage was set to 2.65 V or it was kept 0.2 V less than the pull-in voltage for each temperature, respectively. In all experiments butane flame from micro-torch was used in the lab environment to trigger the switch. The upper temperature was limited to 85° C. due to physical boundary on the detection distance when constant bias was applied.

The dynamic biasing method was used to keep the detection distance constant with no external temperature sensor needed. The device kept constant detection distance (over 70 cm in lab, user defined) over a wide temperature range (−35° C. to 85° C.).

The experiment was the first demonstration of a near-zero power flame detector with a consistent detection accuracy (∼±0.5 m projected for industry standard fire) across a wide operating temperature range (−35° C. to 85° C.) that satisfied industrial applications. The temperature compensation was achieved through passively tuning the detection threshold with a temperature-dependent bias voltage (2.70-4.37 V) applied to the open-circuit PMP hence preserving the near-zero standby power feature. Surprisingly, the required voltage values corresponding to the changing ambient temperature was decided based on a self-check of the pull-in voltage of the pre-calibrated device, which entirely saved the need of using a temperature sensor that would increase the cost and power consumption. Thanks to such a temperature compensation mechanism, the flame detector prototype showed a x19 improved stability compared to previous demonstrations.

Example 3. Multi-Band Detection for False Stimuli Rejection

As illustrated in FIG. 17, flame has high IR intensity radiation at wavelengths at about 2.7 μm and 4.4 μm (ON band). An array of PMPs was fabricated with plasmonic absorbers configured to absorb at different wavelengths. By logically comparing absorption of multiple wavelengths in an array of PMPs, false alarm rates by sources other than flame were decreased. Similarly, when a combination of sources were present, false alarm rates were also decreased. For example, an outcome of a fire alarm was detected when a flame was present in combination with sources other than flame. False alarm stimuli sources of a human close by, a halogen light, LED, soldering iron, and sun (broadband) were utilized for testing the false alarms.

Table 1 indicates false alarms decreased (in quotation marks, e.g., "0" or "1") by logically comparing the wavelengths indicated. The wavelengths of 2.7 μm, 3.9 μm, 4.4 μm and 5.3 μm were indicated and logically tested. Table 1 was examined as a logical "truth table" for possible false stimuli sources that could trigger a false alarm. For example, a false alarm would indicate a flame is present when a flame is not or indicate a flame is not present when a flame is present.

Moving down Table 1, for example, row 6 showed the false alarm rate decreased for a "Human close by" as indicated by the "0" under wavelength 2.7 μm. The proposition "Q" is the conclusion or consequent in logic. This result was promising because decreasing the rate of false alarm triggered by a human close by meant logical comparisons could decrease the rate of false alarms from combinations of stimuli sources. False alarm rate decreased for the sun indicated by the "1" at row 8 under 3.9 μm.

False alarm rate decreased for the combination of the sun and a human close by as was indicated by the "0" and "1" (Comment "Sun+Human") at row 10. The comment "Flame" at row 13 showed a 1 at wavelengths 2.7 μm and 4.4 μm (flame emissions discussed above). In the bottom two rows, combinations of "Flame+Light/Light" and "Flame+Heat/Heat" showed the array of PMPs provided the surprising increase of correct fire alarm and a decrease of incorrect fire alarm when combinations of stimuli were present. The experiments successfully demonstrated that by logically comparing multiple wavelengths, the false alarm rate was decreased.

TABLE 1

False Alarm Rates Decreased

| Wavelength (μm) | | | | Output | |
|---|---|---|---|---|---|
| 2.7 | 3.9 | 4.4 | 5.3 | Q | Comment |
| 0 | 0 | 0 | 0 | 0 | None |
| 0 | 0 | 0 | 1 | 0 | Environment |
| "0" | 0 | 1 | 0 | 0 | Other |
| "0" | 0 | 1 | 1 | 0 | Human close by |
| 0 | "1" | 0 | 0 | 0 | Other |
| 0 | "1" | 0 | 1 | 0 | Sun |
| 0 | "1" | 1 | 0 | 0 | Other |
| "0" | 1 | 1 | "1" | 0 | Sun + Human |
| 1 | 0 | 0 | 0 | 0 | Light |
| 1 | 0 | 0 | 1 | 0 | Light + Human |
| 1 | 0 | 1 | 0 | 1 | Flame |
| 1 | 0 | 1 | 1 | 1 | Flame + Human |
| 1 | 1 | 0 | 0 | 0 | Light |
| 1 | 1 | 0 | 1 | 0 | Light + Sun |
| 1 | "1" | "1" | 0 | 0 or 1 | Flame + Light/Light |
| "1" | "1" | 1 | 1 | 0 or 1 | Flame + Heat/Heat |

New fabrication and release methods were developed to enable high packaging yield for arrays of multi wavelength detectors and PMPs in a single chip. The PMPs could be placed in a logic chip to determine presence of specific events and to decrease the false alarm rate for the specific events. These experiments demonstrated that highly specific sensors with low false alarm rates could be fabricated in a chip. New 4 narrowband (patch and cross type) plasmonic absorbers with high IR absorbance will be fabricated in a single chip to enable multi band single chip false alarm free detectors.

REFERENCES

R H Olsson, C Gordon and R Bogoslovov, "Zero and Near Zero Power Intelligent Microsystems", 2019 *J. Phys.: Conf. Ser.* Florida, 2016 vol. 1407 pp. 012042.

Z. Qian, S. Kang, V. Rajaram, C. Cassella, N. E. McGruer and M. Rinaldi, "Zero-power Infrared Digitizers Based on Plasmonically Enhanced Micromechanical Photoswitches", in Nature Nanotechnology, vol. 12, pp. 969-973, September 2017.

S. Kang, Z. Qian, V. Rajaram, S. D. Calisgan, A. Alu, and M. Rinaldi, "Ultra-narrowband Metamaterial Absorbers for High Spectral Resolution Infrared Spectroscopy", Advanced Optical Materials, vol. 1801236, p. 1801236, November 2018.

V. Rajaram, Z. Qian, S. Kang, N. E. McGruer and M. Rinaldi, "MEMS-Based Near-Zero Power Infrared Wireless Sensor Node", MEMS 2018, Belfast, U K. 2018, pp. 17-20.

S. D. Calisgan, S. Kang, V. Rajaram, Z. Qian and M. Rinaldi, "Threshold-Triggered MEMS-CMOS Infrared Resonant Detector with Near-Zero Standby Power Consumption," 2019 TRANSDUCERS & EUROSENSORS XXXIII, Berlin, Germany, 2019, pp. 637-640.

Texas Instruments, "MSP430FR2433 Mixed-Signal Microcontroller", MSP430FR2433, Datasheet, December 2019.

Ebyte, "E32-915T20D User Manual", E32-915T20D, Datasheet, 2019.

Vishay, "10 pA, Ultra Low Leakage and Quiescent Current, Load Switch with Reverse Blocking", SiP32431, Datasheet, January 2021.

J. Haxhibeqiri, E. De Poorter, I. Moerman and J. Hoebeke, "A survey of LoRaWAN for IoT: From technology to application", Sensors, vol. 18, no. 11, pp. 3995, 2018.

V. Rajaram, Z. Qian, S. Kang, S. D. Calisgan, N. E. McGruer, and M. Rinaldi, "Zero-Power Electrically Tunable Micromechanical Photoswitches", IEEE Sensors Journal, vol. 18, issue 19, pp. 7833-7841, 2018.

B. Szyk, "Battery Life Calculator," Omni Calculator, 13 Jun. 2018 (Online, Accessed: 24 Feb. 2021).

Cui, Yanxia and He, Yingran and Jin, Yi and Ding, Fei and Yang, Liu and Ye, Yuqian and Zhong, Shoumin and Lin, Yinyue and He, Sailing, Plasmonic and Metamaterial Structures as Electromagnetic Absorbers, arXiv, 2014, doi.org/10.48550/arxiv.1404.5695.

InfraTech, Sensor Division, Accessed on 20 Aug. 2021 (infratec-infrared.com/sensor-division/service-support/faq/)

Calisgan, S. D., et al., "Zero-Power Flame Detector with Wide Field-of-View Based on Plasmonically-Enhanced Micromechanical Photoswitch." 2021 21st International Conference on Solid-State Sensors, Actuators and Microsystems (Transducers). IEEE, (2021).

Liu, Z G; Kashef, A; Crampton, GP; Lougheed, GD, Research progress of the international road tunnel fire detection project, NRC Publications Archive, Canada, 2007.

The invention claimed is:

1. An ultra-low power sensor device capable of detecting a signal and measuring a magnitude of the detected signal, the device comprising
    a micromechanical switch comprising a sensor element and two contact elements, wherein the switch is configured to close a gap between the contact elements in response to a signal received by the sensor element;
    a microcontroller comprising a sensing circuit and a battery, the microcontroller configured to apply a voltage bias sweep across the contact elements in response to a signal detected by the sensing element, wherein said voltage bias sweep determines a pull-in voltage that closes the gap between the contacts, and wherein the pull-in voltage provides a measure of the magnitude of the detected signal.

2. The sensor device of claim 1, wherein the micromechanical switch is a micromechanical photoswitch and the signal is an electromagnetic radiation.

3. The sensor device of claim 2, wherein the micromechanical photoswitch comprises a substrate, an absorber head, a reflector head, and said contact elements; wherein the reflector head is attached at one end to the substrate and comprises a metallic layer comprising a microheater and a layer comprising one of said contact elements;
    wherein the absorber head is attached at one end to the substrate and comprises the other of said contact elements and a plasmonic absorber, the plasmonic absorber configured to absorb electromagnetic radiation within a spectral band for detection; and
    wherein the micromechanical photoswitch is configured such that absorption of electromagnetic radiation within said spectral band by the absorber head causes the contact elements to move and close the gap.

4. The sensor device of claim 3, further comprising p1 a first cantilever disposed on the substrate, the first cantilever comprising the absorber head, an inner pair of temperature-sensitive bimaterial legs, and an outer pair of temperature-sensitive bimaterial legs, the inner pair of legs attached to opposite sides of the absorber head, the outer pair of legs attached to a surface of the substrate and disposed adjacent to the inner pair of legs forming first and second sets of inner and outer legs, the first and second sets of legs disposed symmetrically on opposite sides of the absorber head;
    a first thermal isolation region connecting the inner and outer legs of the first set of legs, and a second thermal isolation region connecting the inner and outer legs of the second set of leg;
    a second cantilever on the substrate, the second cantilever disposed adjacent to the first cantilever and with mirror symmetry to the first cantilever; the second cantilever comprising an inner pair of temperature-sensitive bimaterial legs, and an outer pair of temperature-sensitive bimaterial legs, the inner pair of legs attached to opposite sides of the reflector head, the outer pair of legs attached to a surface of the substrate and disposed adjacent to the inner pair of legs forming first and second sets of inner and outer legs, the first and second sets of legs disposed symmetrically on opposite sides of the reflector head; and
    a second thermal isolation region connecting the inner and outer legs of the second set of legs;
    wherein the bimaterial legs of the second cantilever each comprise a bottom insulating layer and a top conductive layer, the legs providing compensation for ambient temperature changes; and wherein the bimaterial legs of the first cantilever and the bimaterial legs of the second cantilever provide similar temperature compensation.

5. The sensor device of claim 2, wherein the electromagnetic radiation has a wavelength in the range from about 100 nm to about 3 mm.

6. The sensor device of claim 5, wherein said electromagnetic radiation is infrared radiation.

7. A method for detecting and determining a magnitude of an electromagnetic radiation, the method comprising the steps of:
    (a) providing the sensor device of claim 1 and, using the microcontroller of the device:
    (b) applying a voltage bias across the contact elements;
    (c) determining a current flow through the contact elements;
    (d) maintaining the sensor device in a standby state while the current flow is less than a wake-up current;
    (e) recording a detection of the electromagnetic radiation when the current flow is at or above the wake-up current;
    (f) applying a reset pulse voltage to the reset microheater, whereby the reflector head is heated and the contact elements are reset; and
    (g) applying a sweeping voltage bias across the contact elements, whereby a pull-in voltage bias is measured, the pull-in voltage bias indicative of a magnitude of the detected electromagnetic radiation.

8. A method for spectral analysis of an electromagnetic radiation, the method comprising:
    (a) providing a device comprising two or more of the sensor devices of claim 1; wherein each of the two or more sensor devices is configured to detect a different spectral band of the electromagnetic radiation; and
    (b) performing, using one or more of the sensor devices, a method comprising the steps of:
        (b1) applying a voltage bias across the contact elements;
        (b2) determining a current flow through the contact elements;
        (b3) maintaining the sensor device in a standby state while the current flow is less than a wake-up current
        (b4) recording a detection of the electromagnetic radiation when the current flow is at or above the wake-up current;

(b5) applying a reset pulse voltage to the reset microheater, whereby the reflector head is heated and the contact elements are reset and (b6) applying a sweeping voltage bias across the contact elements, whereby a pull-in voltage bias is measured, the pull-in voltage bias indicative of a magnitude of the detected electromagnetic radiation.

9. The method of claim 8, whereby a vehicle or living organism is detected, identified, and/or its proximity determined.

10. A kit for detecting the presence of an electromagnetic radiation, the kit comprising two or more devices of claim 1.

11. The sensor device of claim 1, further comprising a wireless transmitter, wherein the device is configured to transmit a radio transmission after said signal is detected, the radio transmission comprising information indicative of the magnitude of the detected signal.

12. The sensor device of claim 1, wherein the microcontroller comprises a processor, a memory, and instructions for performing said voltage bias sweep and storing a measured value of said pull-in voltage bias.

13. The sensor device of claim 12, wherein the memory further comprises a calibration curve, and wherein the processor is operative to compare a measured pull-in voltage bias to the calibration curve and thereby determine the magnitude of the detected signal.

14. The sensor device of claim 1, wherein the device has a power consumption in a standby state of less than about 850 nW.

15. The sensor device of claim 1, wherein the sweeping voltage bias is applied as a pulse width modulated voltage.

16. The sensor device of claim 1, that can continuously remain in a standby state for at least 10 years using a single battery.

17. A sensor device comprising two or more of the sensor devices of claim 1; wherein each of the two or more sensor devices is configured to detect a different signal.

18. The sensor device of claim 17 configured as a spectrometer.

19. A sensor device comprising one or more devices of claim 1, wherein the device is configured as an exhaust heat detector, a plume detector; a living organism detector, a proximity detector, an infrared detector, a visible light detector, a color detector, an activator device configured to activate a machine, or an electro-optical detector.

20. An ultralow power sensor device comprising:
a substrate with a first electrical contact disposed on the substrate;
a movable component attached at one end to the substrate; the component comprising a second electrical contact disposed at an opposite end of the component; the component operative to move in a proportion to a response to an input signal; wherein position of the second contact relative to the first contact determines whether the switch is in an ON or OFF state;
a power supply with a circuit and a voltage applied between the first contact and the second contact; wherein application of the voltage causes the second contact to move toward the first contact in a proportion to the applied voltage;
wherein the input signal comprises a signal derived from the group consisting of a vibration, a physical movement, a temperature change, electromagnetic radiation within a spectral band, a mechanical or electrical shock, a wind or a pressure change, a chemical or biomolecule, a sound, a change in a physical state, and a change in an environmental condition.

\* \* \* \* \*